US012706084B2

(12) United States Patent
Yang et al.

(10) Patent No.: US 12,706,084 B2
(45) Date of Patent: Aug. 11, 2026

(54) DATA PROCESSING METHOD, APPARATUS, ELECTRONIC DEVICE AND STORAGE MEDIUM

(71) Applicant: Beijing Zitiao Network Technology Co., Ltd., Beijing (CN)

(72) Inventors: Fan Yang, Beijing (CN); Ziqi Sun, Beijing (CN); Yongsen Jiang, Beijing (CN); Bingchuan Li, Beijing (CN); Rongkun Gao, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 271 days.

(21) Appl. No.: 18/573,126

(22) PCT Filed: Aug. 24, 2022

(86) PCT No.: PCT/CN2022/114441
§ 371 (c)(1),
(2) Date: Dec. 21, 2023

(87) PCT Pub. No.: WO2023/030121
PCT Pub. Date: Mar. 9, 2023

(65) Prior Publication Data

US 2024/0296830 A1 Sep. 5, 2024

(30) Foreign Application Priority Data

Aug. 31, 2021 (CN) ......................... 202111016229.0

(51) Int. Cl.

| | |
|---|---|
| ***G10L 15/02*** | (2006.01) |
| ***G06V 40/16*** | (2022.01) |
| ***G10L 15/08*** | (2006.01) |

(52) U.S. Cl.
CPC ............ *G10L 15/02* (2013.01); *G06V 40/161* (2022.01); *G10L 15/08* (2013.01); *G10L 2015/088* (2013.01)

(58) Field of Classification Search
CPC .... G10L 15/02; G10L 15/08; G10L 2015/088
See application file for complete search history.

(56) References Cited

U.S. PATENT DOCUMENTS

| | | | |
|---|---|---|---|
| 8,924,453 | B2 | 12/2014 | Fastow et al. |
| 9,697,828 | B1 | 7/2017 | Prasad et al. |

(Continued)

FOREIGN PATENT DOCUMENTS

| | | | |
|---|---|---|---|
| CN | 1870728 | A | 11/2006 |
| CN | 105787884 | A | 7/2016 |

(Continued)

OTHER PUBLICATIONS

Office Action for Japanese Patent Application No. 2023-578190, mailed on Jan. 14, 2025, 12 pages.

(Continued)

*Primary Examiner* — Ibrahim Siddo
(74) *Attorney, Agent, or Firm* — Astute IP Law Group

(57) ABSTRACT

The disclosure discloses a data processing method, apparatus, electronic device, and storage medium. The data processing method includes: collecting audio and video frame data associated with a target user, wherein the audio and video frame data includes voice information to be processed and a face image to be processed; processing the face image to be processed based on a target line-of-sight angle adjustment model to obtain a target face image corresponding to the face image to be processed; performing a following process on the voice information to be processed based on an audio content following method and determining a target sentence in a target text associated with the voice informa- (Continued)

tion to be processed; and displaying the target sentence and the target face image separately on clients associated with the target user, or displaying the target sentence and the target face image on a client associated with the target user together.

20 Claims, 7 Drawing Sheets

(56) References Cited

U.S. PATENT DOCUMENTS

| | | | | |
|---|---|---|---|---|
| 2002/0093591 | A1* | 7/2002 | Gong | H04N 21/2368 348/E7.063 |
| 2013/0254129 | A1* | 9/2013 | Perlmutter | G06Q 10/10 705/321 |
| 2014/0236600 | A1 | 8/2014 | Lu et al. | |
| 2019/0147222 | A1 | 5/2019 | Gao et al. | |
| 2019/0306586 | A1* | 10/2019 | Rasool | G06F 3/013 |
| 2020/0176014 | A1 | 6/2020 | Zhang et al. | |

FOREIGN PATENT DOCUMENTS

| | | | |
|---|---|---|---|
| CN | 106910504 | A | 6/2017 |
| CN | 108491775 | A | 9/2018 |
| CN | 109639935 | A | 4/2019 |
| CN | 110164442 | A | 8/2019 |
| CN | 109658938 | B | 3/2020 |
| CN | 111259135 | A | 6/2020 |
| CN | 111353336 | A | 6/2020 |
| CN | 111372119 | A | 7/2020 |
| CN | 111933110 | A | 11/2020 |
| CN | 112733794 | A | 4/2021 |
| CN | 113703579 | A | 11/2021 |
| JP | H10-290717 | A | 11/1998 |
| JP | 2011-013542 | A | 1/2011 |
| JP | 2019-201360 | A | 11/2019 |
| JP | 2019200651 | A | 11/2019 |
| WO | 2019196863 | A1 | 10/2019 |
| WO | 2020110811 | A1 | 6/2020 |
| WO | 2021057038 | A1 | 4/2021 |

OTHER PUBLICATIONS

International Search Report (with English translation) and Written Opinion issued in PCT/CN2022/114441, dated Nov. 23, 2022, 11 pages provided.
Office Action issued in Chinese Application No. 202111016229.0, dated Nov. 15, 2022, with machine translation.
Extended European Search Report for European Patent Application No. 22863260.0, mailed on Nov. 7, 2024, 9 pages.
Notification to Grant Patent Right for Invention for Chinese Patent Application No. 202111016229.0, mailed on May 2, 2023, 8 pages.
Office Action for Chinese Patent Application No. 202111016229.0, mailed on Feb. 23, 2023, 9 pages.

* cited by examiner

DATA PROCESSING METHOD, APPARATUS, ELECTRONIC DEVICE AND STORAGE MEDIUM

This application claims priority to the Chinese patent application filed with the Chinese Patent Office on Aug. 31, 2021, with application number 202111016229.0, the entire contents of which are incorporated herein by reference.

FIELD

This disclosure relates to the field of computer technology, such as a data processing method, apparatus, electronic device, and storage medium.

BACKGROUND

In various broadcasting scenarios, teleprompters may be used. The teleprompter may display a speech text for the speaker during the speech. Usually, the teleprompter is placed below the front of the camera lens, and there is a transparent glass or a special beam splitter placed at a 45-degree angle between the teleprompter and the camera lens. The glass or beam splitter is disposed to reflect light from the direction of the teleprompter to the speaker and transmit light from the direction of the speaker into the camera lens. In addition, the light shield disposed around the camera lens and the back of the glass or beam splitter may also cooperate to prevent unnecessary light reflection from entering the camera lens.

With the development of internet technology, every video creator may become a user of the teleprompter. However, there are problems in traditional teleprompters, such as large footprint, complex operation process, and poor universality.

SUMMARY

The present disclosure provides a data processing method, apparatus, electronic device, and storage medium to achieve the technical effect of convenient broadcasting and universality.

The present disclosure provides a data processing method, including:

- collecting audio and video frame data associated with a target user, wherein the audio and video frame data includes voice information to be processed and a face image to be processed;
- processing the face image to be processed based on a target line-of-sight angle adjustment model to obtain a target face image corresponding to the face image to be processed;
- performing a following process on the voice information to be processed based on an audio content following method and determining a target sentence in a target text associated with the voice information to be processed; and
- displaying the target sentence and the target face image separately on clients associated with the target user, or displaying the target sentence and the target face image on a client associated with the target user together.

The present disclosure also provides a data processing apparatus, including:

- an audio and video frame data collecting module configured to collect audio and video frame data associated with a target user, wherein the audio and video frame data includes voice information to be processed and a face image to be processed;
- a face image processing module configured to perform a following process on the face image to be processed based on a target line-of-sight angle adjustment model to obtain a target face image corresponding to the face image to be processed;
- a target sentence determining module configured to perform a following process on the voice information to be processed based on an audio content following method and determining a target sentence in a target text associated with the voice information to be processed; and
- a display module configured to display the target sentence and the target face image separately on clients associated with the target user, or display the target sentence and the target face image on a client associated with the target user together.

The present disclosure also provides an electronic device, the electronic device comprising:

- one or more processors;
- a storage apparatus configured to store one or more programs;
- when the one or more programs are executed by the one or more processors, the one or more processors implement the data processing method as described above.

The present disclosure also provides a storage medium containing computer-executable instructions for performing the data processing method described above when executed by a computer processor.

DETAILED DESCRIPTION

Figure 1:
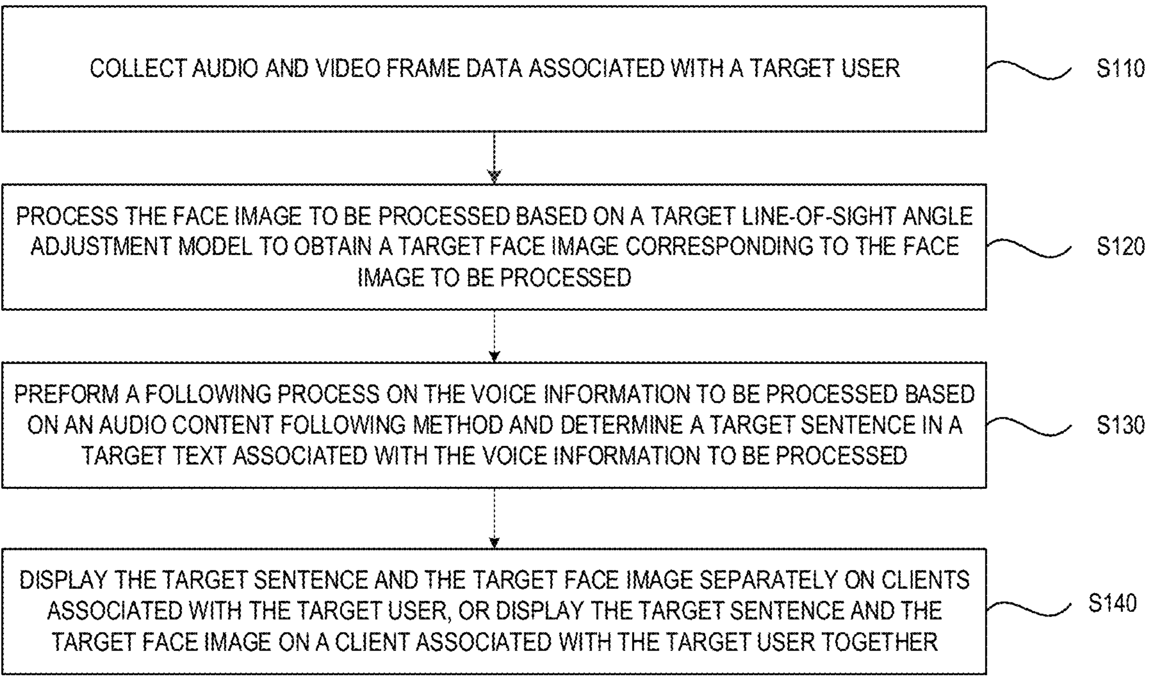
FIG. 1 is a schematic flowchart of a data processing method provided in Embodiment One of the present disclosure.

The following will describe the embodiments of the present disclosure with reference to the accompanying drawings. Although some embodiments of the present disclosure are shown in the drawings, the present disclosure can be implemented in various forms and should not be construed as limited to the embodiments set forth herein. The drawings and embodiments of the present disclosure are for illustrative purposes only.

A plurality of steps recorded in the method implementation of the present application can be performed in different orders and/or in parallel. In addition, the method implementation can include additional steps and/or omit the steps as shown. The scope of the present disclosure is not limited in this regard.

The term "including" and its variations as used herein are non-exclusive inclusion, i.e. "including but not limited to". The term "based on" means "at least partially based on". The term "one embodiment" means "at least one embodiment"; the term "another embodiment" means "at least one additional embodiment"; and the term "some embodiments" means "at least some embodiments". Relevant definitions of other terms will be given in the following description.

The concepts of "first" and "second" mentioned in this disclosure are only used to distinguish different apparatuses, modules, or units, but are not used to limit the order or interdependence of the functions performed by these apparatuses, modules, or units. It shall be noted that the modifications of "one" and "a plurality of" mentioned in this disclosure are illustrative but not limiting. Those skilled in the art should understand that unless otherwise indicated in the context, they should be understood as "one or more".

The names of the messages or information interacted between a plurality of apparatuses in this public implementation are for illustrative purposes only, which are not intended to limit the scope of these messages or information.

Embodiment One

FIG. 1 is a schematic flowchart of a data processing method provided in Embodiment One of the present disclosure. The present disclosure may be applied to a situation where the target text can dynamically follow the user in the scenario of voice broadcasting by a target user, and the user's face image can be processed at the same time. The method can be executed by a data processing apparatus. The data processing apparatus may be implemented in the form of software and/or hardware, for example, by an electronic device, which can be a mobile terminal, a personal computer (Personal Computer, PC) or a server, etc. Real-time interactive application scenarios may usually be implemented through cooperation of the client and server. The method provided in this embodiment may be executed by the client, the server, or by combination of the client and the server.

S110, collecting audio and video frame data associated with a target user.

The technical solution provided by the embodiment of the present disclosure can be integrated in one application; or an application can be developed based on the technical solution of the present disclosure, and the user may perform voice broadcasting, video broadcasting, etc. based on the application.

Audio and video frames may be collected when users interact based on real-time interactive interfaces, and the real-time interactive interfaces are any interactive interfaces in real-time interactive application scenarios. Real-time interactive scenarios can be implemented through the Internet and computer means, such as interactive applications implemented through native programs or web programs. Real-time interactive application scenarios can be LIVE scenarios, video conferencing scenarios, voice broadcasting scenarios, and recorded video scenarios. LIVE scenarios can include sales through LIVE in applications, as well as live broadcasting scenarios based on LIVE platforms; voice broadcasting scenarios can be scenarios where anchors in TV stations broadcast corresponding content, and multimedia data streams broadcast by anchors can be sent to at least one client based on cameras. The audio and video frame data includes voice information to be processed and a face image to be processed. When a target user broadcasts based on the target text, the voice information of the target user can be collected based on the voice collecting apparatus, and the collected voice information can be used as the voice information to be processed. For example, the voice collecting apparatus may be a microphone array on a mobile terminal, or a microphone array in an environment where the user is located. Correspondingly, in a process of broadcasting by the user, the face image information of the target user can also be collected based on the camera apparatus, and the image collected at this time can be used as the face image to be processed.

In this embodiment, the audio and video frame data associated with the target user may be collected in real-time or periodically. For example, real-time interactive interfaces are generated based on scenarios of online video broadcasting. The video broadcasting scenario includes an anchor (target user) and a viewing user who views broadcasting of the anchor. When the anchor broadcasts based on pre-set broadcasting sentence, the camera apparatus and the voice collecting apparatus may collect the voice information and face image information of the target user in real time or every few seconds, such as every 5 seconds, to obtain the audio and video frame data.

When the user interacts based on the real-time interactive interface, the face image information and voice information corresponding to the target user can be collected based on the camera apparatus and the voice collecting apparatus, so as to process the voice information and the face image and send the processed face image and voice information to other clients in the form of data streams.

In the present embodiment, when the target user broadcasts content, he/she broadcasts mainly based on the target text, and the target text can be uploaded to an application developed based on the present technical solution, or uploaded to a prompter program on a mobile terminal, so that the application or the prompter program can process the target text.

In the present embodiment, the collecting audio and video frame data associated with the target user, includes: when detecting that a preset event is triggered, collecting the voice information to be processed of the target user based on a voice collecting apparatus, and collecting the face image to be processed of the target user based on a camera apparatus.

Triggering a preset event may include triggering wake-up words, triggering a line-of-sight adjustment control, detecting the presence of a user before the display screen, and/or collecting voice information.

During the application process, when it is detected that the target user has triggered a preset event, the voice information to be processed and the face image to be processed of the target user may be collected.

S120, processing the face image to be processed based on a target line-of-sight angle adjustment model to obtain a target face image corresponding to the face image to be processed.

Generally, the camera apparatus on a general terminal device is installed at a specific position on the terminal. For example, the camera apparatus is installed at the top edge of the terminal. When the target user interacts with other users based on the display screen, there is a certain deviation between the shooting angle of the camera apparatus and the line-of-sight of the target user. Therefore, the line-of-sight of the target user may not be at the same horizontal line as the camera apparatus, resulting in a certain angle deviation in the line-of-sight of the target user viewed by the user watching the LIVE. For example, there may be a situation where the line-of-sight of the target user is viewed by the user in the terminal as a strabismus. Alternatively, when the target user broadcasts based on the target text displayed on the teleprompter, there may be a situation where the target user needs to see the target text. At this time, the line-of-sight of the target user may be out of focus due to the position deviation between the display position of the target text and the camera apparatus, thereby affecting the interaction effect. To solve the above problem, the target line-of-sight angle adjustment model may be used to adjust the line-of-sight angle of the user in the face image to be processed.

The target line-of-sight adjustment model is a pre-trained model for focusing the line-of-sight of the target user in the face image to be processed. The target face image is an image obtained by focusing the line-of-sight in the face image to be processed through the target line-of-sight adjustment model. Focusing may refer to focusing the line-of-sight angle of a user in a face image to be processed to the target angle. For example, adjusting the position of the pupil in the eye so that the line-of-sight angle of the target user can be adjusted to the target line-of-sight angle. The target line-of-sight angle may also be called a target angle in which the line-of-sight of the user is perpendicular to the display screen, that is, an angle at which the line-of-sight of the user faces up to the display screen. The target line-of-sight angle may be any pre-set angle. In order to improve the interaction efficiency between the anchor user and other users, the target line-of-sight angle can be an angle at which the line-of-sight of the target user and the camera apparatus are placed at the same horizontal line.

As long as the face image to be processed is collected, the face image to be processed can be input into the target line-of-sight angle adjustment model for adjustment processing, so as to adjust the line-of-sight angle of the target user in the face image to be processed to the target angle.

The line-of-sight of the target user in the face image to be processed can be focused or unfocused. In practical applications, in order to avoid processing all the face images to be processed, after obtaining a face image to be processed, the face image to be processed can be preprocessed.

In one embodiment, whether the line-of-sight feature in the face image to be processed matches the preset line-of-sight feature is determined based on the feature detection module; if the line-of-sight feature in the face image to be processed does not match the preset line-of-sight feature, the face image to be processed is processed based on the target line-of-sight angle adjustment model to obtain the target face image.

The feature detection module is configured to detect the line-of-sight feature of the user, and it is basically configured to determine whether the line-of-sight angle of the user is consistent with the target angle. The preset line-of-sight feature is a feature that matches the target angle. The preset line-of-sight feature can be a feature as eyelids, pupils, such as the position of a pupil in an eye socket.

After obtaining the face image to be processed, the face image to be processed can be processed based on the feature detection module to determine whether the line-of-sight feature in the face image to be processed matches the preset line-of-sight feature. If the line-of-sight feature in the face image to be processed is inconsistent with the preset line-of-sight feature, it indicates that the line-of-sight angle of the target user is inconsistent with the target angle. At this time, the focusing processing can be performed to the face image to be processed based on the target line-of-sight angle adjustment model to obtain the target face image.

S130, performing a following process on the voice information to be processed based on an audio content following method and determining a target sentence in a target text associated with the voice information to be processed.

The audio content following method may include in the process that the target user is broadcasting, identifying the voice information of the target user to determine the position of the broadcast content in the target text, thereby realizing a real-time following method of oral text content. That is, regardless of whether the speed of the oral broadcasting of the target user, the real-time speech speed of the target user may be followed, thus solving the problem that the speed at which the target user broadcasts the text is slower or faster than the fixed text scrolling speed. The target sentence is a sentence in the target text corresponding to the voice information to be processed. The target text is a text that the user has uploaded in advance and needs to be broadcast according to its content.

Identification and following processing may be performed on the voice information to be processed according to a pre-set audio content following method, and the target sentence in the target text corresponding to the voice information to be processed can be determined.

S140, displaying the target sentence and the target face image separately on clients associated with the target user, or displaying the target sentence and the target face image on a client associated with the target user together.

The displaying the target sentence and the target face image separately on clients associated with the target user may include displaying the target sentence in some clients, and displaying the target face image in other clients; correspondingly, the displaying the target sentence and the target face image together in a relevant client may include displaying both the target sentence and the target face image on a client as long as it is a client associated with the target user. Those skilled in the art will understand that for the target sentence and the target face image, the distinguishing display mode of the two can be set according to actual needs, and the embodiments of the present disclosure do not make limitation on this.

During the display process, for the target sentence, the target sentence may also be displayed distinctively. Displaying distinctively may refer to displaying the target sentence distinctively as compared with displaying other content in the target text. For example, the target sentence can be associated with the content that the target user is currently saying and can be displayed separately on the client; or the target sentence and the sentences before and after the target sentence can also be displayed in the client at the same time, and the target sentence can be highlighted based on font bold and highlighting. The multimedia data stream may be a data stream generated when the target user is broadcasting, for example, the entire video stream during the broadcasting process. If at least one user views the broadcasting by the target user through a terminal device, a client corresponding to the viewing user can be the client associated with the target user. The target face image and audio information can be sent as multimedia data streams to at least one client to display the target face image of the target user and broadcast the audio information corresponding to the target user on the client.

The video stream corresponding to the broadcasting of the target user is finally displayed on the client.

After determining the target sentence, the target sentence can be distinctively displayed in the target text. At this time, the target text is displayed on the terminal device corresponding to the target user. At the same time, the target face image corresponding to the target user can be sent to the client associated with the target user, so that the image of the target user displayed by the client corresponding to the viewing user is the image focused by the target line-of-sight adjustment model.

Figure 2:
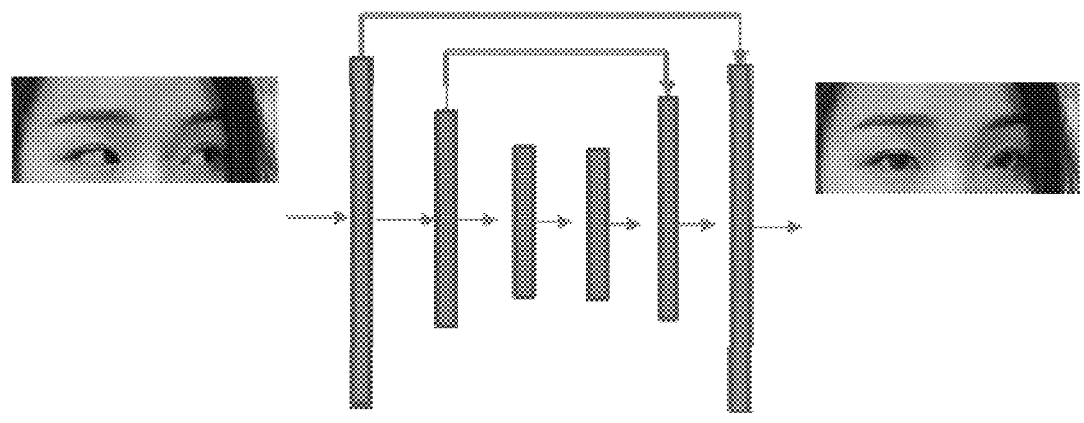
FIG. 2 is a schematic diagram of processing a face image based on a target line-of-sight angle adjustment model provided in embodiment one of the present disclosure.

In order to understand the technical effect achieved by this technical solution, please refer to the schematic diagram shown in FIG. 2. If the line-of-sight of the user in the face image to be processed is detected as strabismus, after the focusing processing performed by the target line-of-sight angle adjustment model, a frontal image as shown in FIG. 2 is obtained, and the line-of-sight angle in the frontal image is consistent with the target angle. The image displayed on the client is the target face image in which the line-of-sight has been focusing processed.

According to the technical solution of the embodiment of the present disclosure, the voice information to be processed and the face image to be processed of the target user may be collected, and then the voice information to be processed and the face image to be processed is processed to obtain the target face image and the position of the target sentence in the target text corresponding to the voice information to be processed. Thus, the problem in the related art that the teleprompter occupies a large area and the use of the teleprompter is complicated and thus is inconvenient, is solved, thereby achieving the technical effect that high-efficiency broadcasting can be performed based on the mobile terminal.

Embodiment Two

Figure 3:
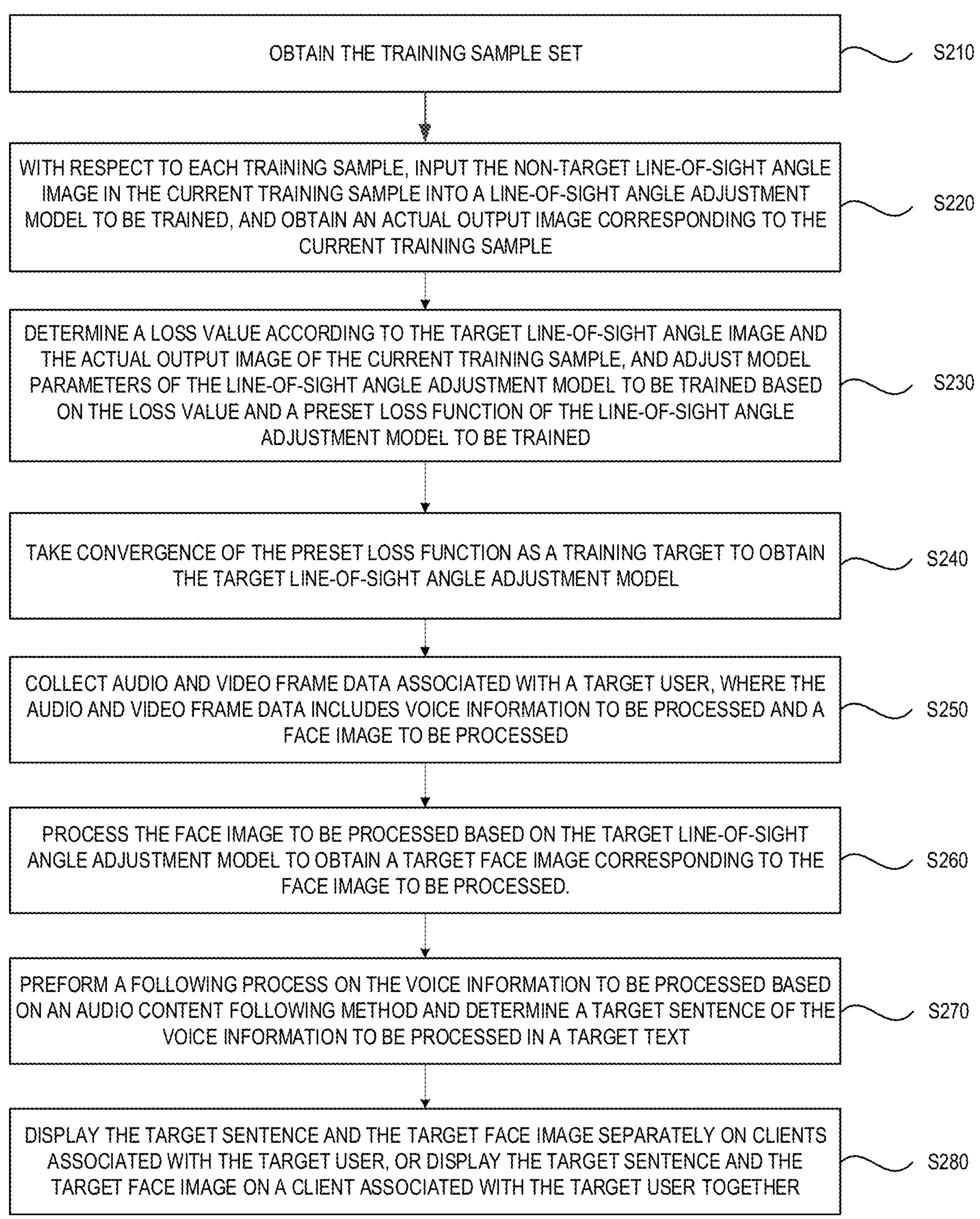
FIG. 3 is a schematic flowchart of a data processing method provided in Embodiment Two of the present disclosure.

FIG. 3 is a schematic flowchart of a data processing method according to Embodiment Two of the present disclosure. On the basis of the foregoing embodiments, before processing the face image to be processed based on the target line-of-sight angle adjustment model, the target line-of-sight angle adjustment model can be obtained by training firstly. For the specific way for training to obtain the target line-of-sight angle adjustment model, the description of the present technical solution can be referred to, where technical terms the same as or corresponding to those in the above embodiments are not repeated here.

As shown in FIG. 3, the method includes:

S210, obtaining the training sample set.

Before obtaining the target line-of-sight angle adjustment model by training, it is necessary to obtain training samples to performing training based on the training samples. In order to improve the accuracy of the model, it is recommended to obtain as many and rich training samples as possible.

The training sample set includes a plurality of training samples, each training sample includes a target line-of-sight angle image and a non-target line-of-sight angle image, and the training samples are determined based on a pre-trained target sample generative model.

The target line-of-sight angle image is a face image in which the line-of-sight of the user is consistent with the target angle. The non-target line-of-sight angle image is a face image in which the line-of-sight of the user is inconsistent with the target angle. The target sample generative model can be a model for generating training samples.

The target sample generative model can be obtained firstly by training. The target sample generative model includes a positive sample generative sub-model and a negative sample generative sub-model. The positive sample generative sub-model is configured to generate the target line-of-sight angle image in the training sample image. The line-of-sight angle of the user in the target line-of-sight angle image is consistent with the target angle. Correspondingly, the negative sample generative sub-model is configured to generate the non-target line-of-sight angle image in the training sample image, and the line-of-sight angle of the user in the non-target line-of-sight angle image is inconsistent with the target angle.

S220, for each training sample, inputting the non-target line-of-sight angle image in the current training sample into a line-of-sight angle adjustment model to be trained, and obtaining an actual output image corresponding to the current training sample.

S230, determining a loss value according to the target line-of-sight angle image and the actual output image of the current training sample, and adjusting model parameters of the line-of-sight angle adjustment model to be trained based on the loss value and a preset loss function of the line-of-sight angle adjustment model to be trained.

S240, taking convergence of the preset loss function as a training target to obtain the target line-of-sight angle adjustment model.

In the above process of determining the target line-of-sight angle adjustment model, the target line-of-sight angle adjustment model can be obtained by training the line-of-sight angle adjustment model to be trained according to each training sample in the training sample. Each non-target line-of-sight angle image in the training samples can be used as the input of the line-of-sight angle adjustment model to be trained, and the target line-of-sight angle image corresponding to the non-target line-of-sight angle image can be used as the output of the line-of-sight angle adjustment model to be trained to adjust the model parameters in the line-of-sight angle adjustment model to be trained. When it is detected that the loss function in the line-of-sight angle adjustment model to be trained converges, it is determined that the target line-of-sight angle adjustment model is obtained by training.

S250, collecting audio and video frame data associated with a target user, where the audio and video frame data includes voice information to be processed and a face image to be processed.

S260, processing the face image to be processed based on a target line-of-sight angle adjustment model to obtain a target face image corresponding to the face image to be processed.

S270, performing a following process on the voice information to be processed based on an audio content following method and determining a target sentence of the voice information to be processed in a target text.

S280, displaying the target sentence and the target face image separately on clients associated with the target user, or displaying the target sentence and the target face image on a client associated with the target user together.

In the present embodiment, the displaying the target sentence and the target face image separately on clients associated with the target user, or displaying the target sentence and the target face image on a client associated with the target user together includes: distinctively displaying the target sentence in the target text on a first client, and displaying a target audio and video frame corresponding to the target face image on a second client.

The first client and the second client are relative to each other and they can be the same or different. The first client may be a client used by the target user, and the second client may be a client used by another user watching the LIVE of the target user.

In a real-time interactive scenario, each collected face image to be processed can be processed, and the obtained target face image can be sent to other clients in the form of multimedia data streams. Thus, on one hand, the shot video is more flexible and interactive, and on the other hand, the viewing user can see an image with a line-of-sight angle always being focused on the target angle, which improves the user's viewing experience.

In the technical solution of the embodiment of the present disclosure, before processing the face image to be processed based on the target line-of-sight angle adjustment model, the target line-of-sight angle adjustment model can be obtained firstly by training, so that each face image to be processed collected by the camera apparatus can be processed based on the target line-of-sight angle adjustment model to obtain the target face image with focused line-of-sight. The target face image is sent to at least one client, so that each user can view the target user with focused line-of-sight, and thus obtain a more interactive video stream.

Embodiment Three

Figure 4:
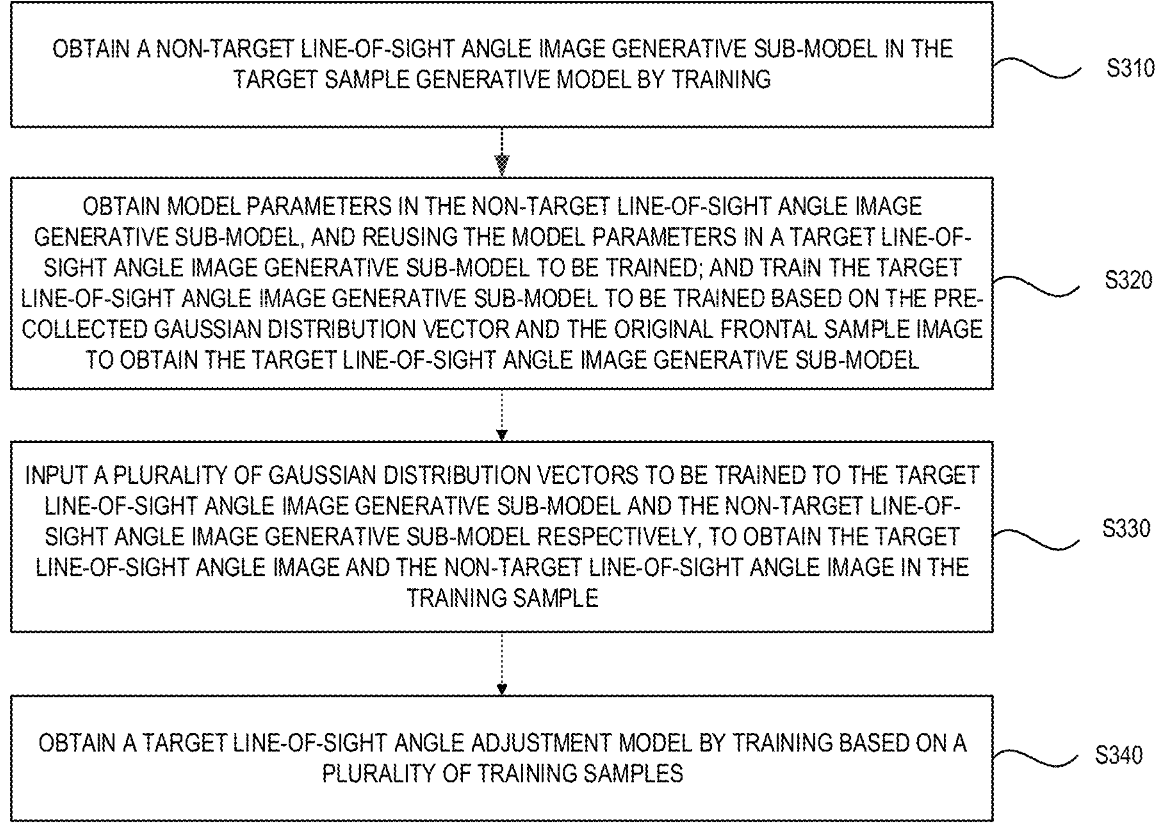
FIG. 4 is a schematic flowchart of a data processing method provided in Embodiment Three of the present disclosure.

FIG. 4 is a schematic flowchart of a data processing method according to Embodiment Two of the present disclosure. On the basis of the foregoing embodiments, before obtaining the target line-of-sight angle adjustment model by training, corresponding training samples may be generated based on a target sample generative model, and correspondingly, before obtaining the training samples, the target sample generative model can be obtained by training firstly. For the specific way for training the target sample generative model and the generating training samples, the description of the present technical solution can be referred to, where technical terms the same as or corresponding to those in the above embodiments are not repeated here.

As shown in FIG. 4, the method includes:

S310, obtaining a non-target line-of-sight angle image generative sub-model in the target sample generative model by training.

A pre-collected Gaussian distribution vector and an original non-frontal sample image are input to a non-target line-of-sight angle image generative sub-model to be trained to obtain an error value; based on the error value and a loss function in the non-target line-of-sight angle image generative sub-model to be trained, model parameters in the non-target line-of-sight angle image generative sub-model to be trained are corrected; the convergence of the loss function is taken as a training target to obtain the non-target line-of-sight angle image generative sub-model, so as to generate the non-target line-of-sight angle image in the training sample based on the non-target line-of-sight angle image generative sub-model.

In the present embodiment, the inputting a pre-collected Gaussian distribution vector and an original non-frontal sample image into a non-target line-of-sight angle image generative sub-model to be trained to obtain an error value, including:

processing the Gaussian distribution vector based on a generator in the non-target line-of-sight angle image generative sub-model to be trained to obtain an image to be compared; and processing the original non-frontal sample image and the image to be compared based on a discriminator in the non-target line-of-sight angle image generative sub-model to be trained to obtain the error value.

The Gaussian distribution vector can be random sampling noise. A face image of a user can be collected when the user is not straightly facing, so as to obtain an original non-frontal sample image. The model parameters in the non-target line-of-sight angle image generative sub-model to be trained are default parameter values. The Gaussian distribution vector and the original non-frontal sample image can be used as inputs to the non-target line-of-sight angle image generative sub-model to be trained to obtain the actual output result. According to the actual output result and the original non-frontal sample image, the error value can be obtained. Based on the error value and the preset loss function in the non-target line-of-sight angle image generative sub-model, the model parameters in the sub-model can be corrected. The convergence of the loss function may be taken as the training target to obtain the non-target line-of-sight angle image generative sub-model.

When training a plurality of sub-models disclosed in this technical solution, adversarial training can be used. According to adversarial training, the non-target line-of-sight angle image generative sub-model may include a generator and a discriminator. The generator is configured to process the Gaussian distribution vector to generate a corresponding image. The discriminator is configured to determine similarity between the generated image and the original image, so as to adjust model parameters in the generator and discriminator according to the error until training of the non-target line-of-sight angle image generative sub-model is completed.

The generator in the non-target line-of-sight angle image generative sub-model processes the Gaussian distribution vector to obtain an image to be compared corresponding to the Gaussian distribution vector. At the same time, the image to be compared and the original non-frontal sample image may be input to the discriminator, and the discriminator may perform discriminant processing on the two images to obtain output results. The model parameters in the generator and discriminator can be corrected according to the output results. When it is detected that the loss function of the model converges, the obtained model can be used as a non-target line-of-sight angle image generative sub-model.

S320, obtaining model parameters in the non-target line-of-sight angle image generative sub-model, and reusing the model parameters in a target line-of-sight angle image generative sub-model to be trained; and training the target line-of-sight angle image generative sub-model to be trained based on the pre-collected Gaussian distribution vector and the original frontal sample image to obtain the target line-of-sight angle image generative sub-model.

After obtaining the non-target line-of-sight angle generative sub-model, the target line-of-sight angle generative sub-model can be obtained by training. For example, model parameters in the non-target line-of-sight angle image generative sub-model are obtained, and then the model parameters are reused in a target line-of-sight angle image generative sub-model to be trained; and the target line-of-sight angle image generative sub-model to be trained is trained based on the pre-collected Gaussian distribution vector and the original frontal sample image to obtain the target line-of-sight angle image generative sub-model.

At this time, the target line-of-sight angle image generative sub-model to be trained is also trained based on adversarial training, that is, the sub-model also includes a generator and discriminator. The effects of the generator and discriminator are the same as those used in the sub-model as mentioned above. The method for training the target line-of-sight angle image generative sub-model is the same as that for obtaining the non-target line-of-sight angle image generative sub-model, which will not be repeated here.

In order to improve the convenience of training the target line-of-sight angle image generative sub-model, after completing training of the non-target line-of-sight angle image generative sub-model, it is possible to reuse the model parameters of the non-target line-of-sight angle image generative sub-model, that is using these model parameters as initial model parameters in the target line-of-sight angle image generative sub-model obtained by training.

S330, inputting a plurality of Gaussian distribution vectors to be trained to the target line-of-sight angle image generative sub-model and the non-target line-of-sight angle image generative sub-model respectively, to obtain the target line-of-sight angle image and the non-target line-of-sight angle image in the training sample.

The target line-of-sight angle image generative sub-model and the non-target line-of-sight angle image generative sub-model as a whole may be taken as the target sample generative model. Alternatively, the target line-of-sight angle image generative sub-model and the non-target line-of-sight angle image generative sub-model can be encapsulated together, so that two images can be output according to an input, and the line-of-sight angles of the user in the two images are different.

A general problem in training models is that a large number of samples need to be collected, and the sample collection is difficult to some extent. For example, in this embodiment, a large number of images of users under the target line-of-sight and non-target line-of-sight are collected, and thus sample collection is difficult and the standards are inconsistent. Based on this technical solution, random sampling noise can be directly processed to obtain images of the same user under different line-of-sight angles, thereby obtaining corresponding samples, which improves the convenience and universality in determining samples, and thus improves the convenience of training models.

In an embodiment, based on the target line-of-sight angle image generative sub-model and non-target line-of-sight angle image generative sub-model in the target sample generative model, a plurality of Gaussian distribution vectors are processed sequentially to obtain target line-of-sight angle images and non-target line-of-sight angle images in the training samples.

S340, obtaining a target line-of-sight angle adjustment model by training based on a plurality of training samples.

In the technical solution of the embodiment of the present disclosure, the random sampling noise can be processed by the target sample generation model obtained through pre-training to obtain a large number of training samples for training the target line-of-sight angle adjustment model, and thus improving the convenience and uniformity in obtaining training samples.

Embodiment Four

Figure 5:
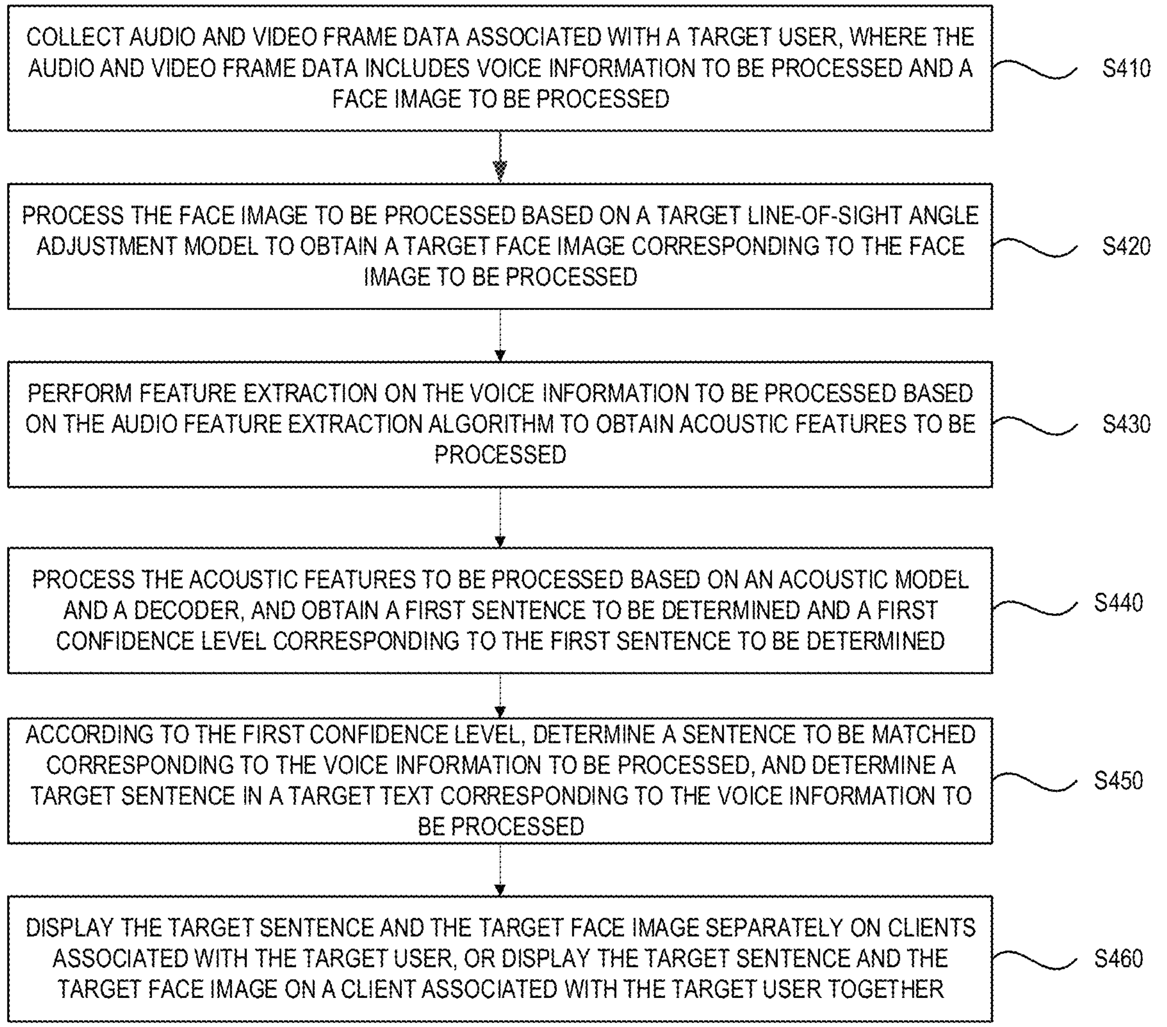
FIG. 5 is a schematic flowchart of a data processing method provided in Embodiment Four of the present disclosure.

FIG. 5 is a schematic flowchart of a data processing method according to Embodiment Four of the present disclosure. On the basis of the foregoing embodiments, description of performing a following process on the voice information to be processed based on a preset audio content following method and determining a target sentence in a target text associated with the voice information to be processed will be provided. For the specific way for determining the target sentence, the description of the present technical solution can be referred to. The same or corresponding technical terms as the above embodiments are not repeated here.

As shown in FIG. 4, the method includes:

S410, collecting audio and video frame data associated with a target user, wherein the audio and video frame data includes voice information to be processed and a face image to be processed.

S420, processing the face image to be processed based on a target line-of-sight angle adjustment model to obtain a target face image corresponding to the face image to be processed.

S430, performing feature extraction on the voice information to be processed based on the audio feature extraction algorithm to obtain acoustic features to be processed.

The audio feature extraction algorithm is an algorithm for extracting audio information features. The audio content following method may be a method for processing the acoustic features of the voice information to be processed to obtain sentences corresponding to the voice information to be processed, that is, the method for determining the characters corresponding to the voice information to be processed.

After collecting the voice information to be processed, acoustic feature extraction can be performed based on the pre-set audio feature extraction algorithm to obtain the acoustic features in the voice information to be processed.

S440, processing the acoustic features to be processed based on an acoustic model and a decoder, and obtaining a first sentence to be determined and a first confidence level corresponding to the first sentence to be determined.

The acoustic model may be used to process the extracted acoustic features to obtain an acoustic posterior probability model corresponding to the acoustic features. A corresponding decoder is generated based on the content of the target text, that is, different decoders correspond to different target texts. The first sentence to be determined is a sentence corresponding to the voice information to be processed and obtained after the acoustic features to be processed is processed based on the acoustic model and the decoder. The first confidence level is configured to characterize a credibility of the first sentence to be determined.

The acoustic features to be processed can be input into the acoustic model, and the acoustic posterior probability corresponding to the acoustic features to be processed can be obtained. After inputting the acoustic posterior probability to the decoder, the first sentence to be determined corresponding to the acoustic features to be processed can be obtained, and the first confidence level of the first sentence to be determined can also be output.

In this embodiment, the voice information to be processed can be processed based on the decoder in the audio content following method. The acoustic features to be processed are processed firstly through an acoustic model to obtain an acoustic posterior probability corresponding to the acoustic features to be processed. Taking the acoustic posterior probability as the input of the decoder, the first sentence to be determined corresponding to the acoustic posterior probability and the first confidence level of the first text to be determined are obtained. The first confidence level is configured to characterize the accuracy of the first sentence to be determined. In practical applications, if the first confidence level reaches a preset confidence threshold, it indicates that the accuracy of the first sentence to be determined is relatively high, and the first sentence to be determined can be used as a sentence to be matched.

S450, determining a sentence to be matched corresponding to the voice information to be processed, and determining a target sentence in a target text corresponding to the voice information to be processed, according to the first confidence level.

If the first confidence level is greater than the preset confidence threshold, the first sentence to be determined can be taken as the sentence to be matched, and the target sentence in the target text corresponding to the sentence to be matched can also be determined.

Based on the above technical solution, if a keyword detection system is adopted to process the acoustic features to be processed, the method may include: based on the keyword detection system in the audio content following method and the acoustic features to be processed, determining a second sentence to be determined corresponding to the acoustic features to be processed and a second confidence level corresponding to the second sentence to be determined; where, the keyword detection system is matched with the target text, and when the second confidence level satisfies a preset confidence threshold, taking the second sentence to be determined as a sentence to be matched.

The acoustic features to be processed may be input into the keyword detection system, and the keyword detection system may output the second sentence to be determined corresponding to the acoustic features to be processed, as well as the second confidence level of the second sentence to be determined. If the second confidence level value is higher than the preset confidence threshold, it indicates that the second sentence to be determined is more accurate. At this time, the second sentence to be determined can be taken as the sentence to be matched.

In order to improve the accuracy of the determined sentence to be matched, the decoder and keyword detection system may jointly process the acoustic features to be processed to determine the sentence to be matched corresponding to the acoustic features to be processed.

In one embodiment, in case where a keyword detection system and the decoder are included in the audio content following method and acoustic features to be processed are processed based on the keyword detection system and the decoder respectively to obtain a first sentence to be determined and a second sentence to be determined, a sentence to be matched is determined according to a first confidence level of the first sentence to be determined and a second confidence level of the second sentence to be determined.

The acoustic features to be processed can be processed based on the decoder and keyword detection system respectively to obtain the first sentence to be determined and the second sentence to be determined corresponding to the acoustic features to be processed. At the same time, the confidence levels of the first sentence to be determined and the second sentence to be determined can also be obtained. The content of the first sentence to be determined and the content of the second sentence to be determined can be the same or different, and correspondingly, the first and second confidence levels can be the same or different.

If the first sentence to be determined and the second sentence to be determined are the same, and both the first confidence level and the second confidence level are higher than the preset confidence threshold, any one of the first sentence to be determined and the second sentence to be determined can be taken as the sentence to be matched. If the content of the first sentence to be determined is different from that of the second sentence to be determined, and both the first and second confidence levels are higher than the preset confidence threshold, the sentence to be determined in the first and second sentences to be determined with a higher confidence level can be taken as the sentence to be matched. If the content of the first sentence to be determined is different from that of the second sentence to be determined, and both the first and second confidence levels are lower than the preset confidence threshold, it indicates that the content currently being spoken by the target user is irrelevant to the content in the target text, and thus the sentence in the target text corresponding to the current voice information will not be determined.

S460, displaying the target sentence and the target face image separately on clients associated with the target user, or displaying the target sentence and the target face image on a client associated with the target user together.

In the present embodiment, displaying the target sentence distinctively in the target text includes: highlighting the target sentence; or, displaying the target sentence in bold; or, displaying other sentences except the target sentence in a semi-transparent form. The transparency of a preset number of unbroadcast texts adjacent to the target sentence is lower than the transparency of other text to be broadcast.

The target sentence can be highlighted to remind the user that this sentence is currently being broadcast; or the target sentence can be displayed in bold. Alternatively, other sentences except the target sentence can be displayed semi-transparently to avoid interference to the broadcasting of the target user when other sentences are displayed. Generally, in order to facilitate the target user to understand the corresponding content before and after the target sentence, the transparency of a preset number of sentences adjacent to the target sentence can be set lower, so that the target user can understand the meaning of sentences before and after the target sentence during the broadcasting process, thereby improving the broadcasting efficiency and use experience of the user who is broadcasting.

After processing the face image to be processed of the target user, an entire data stream of the target face image and audio information associated with the target face image can be sent to the client associated with the target user.

In the technical solution of the embodiment of the present disclosure, the voice information to be processed can be processed by using the audio content following method to obtain the sentence to be matched, the position of the sentence to be matched in the target text can be determined, and the text at this position are displayed distinctively, so as to intelligently follow the target text, thereby realizing the technical effect of the broadcasting of the target user.

Based on the above technical solution, in order to quickly determine a target sentence in the target text to be broadcast corresponding to the sentence to be matched, the method may include: at the current time, if the target text includes a broadcast sentence that has been distinguishingly displayed, determining the target sentence in the target text corresponding to the sentence to be matched by taking the broadcast sentence as a starting point.

During the broadcasting process of the target user, the sentences that have been broadcast and those that have not been broadcast in the target text are distinguished. For example, the broadcast and unbroadcast sentences can be displayed in different fonts or transparency. For example, the transparency of the broadcast texts can be set higher to reduce interference with the unbroadcast texts. When determining the target sentence at the current time, by taking the last sentence in the broadcast sentences as a starting point, a sentence in the unbroadcast sentences that is consistent with the sentence to be matched is determined as the target sentence, and the target sentence is displayed distinctively.

Different display methods can be pre-set corresponding to different contents, that is, the way to distinguish broadcast sentences, unbroadcast sentences, and target sentence can be different, so as to achieve the technical effect of effectively reminding broadcasting users.

In the actual application process, in order to improve the efficiency of determining the target sentence, a broadcast sentence can be used as the starting point and a preset number of sentences after the starting point can be obtained. For example, three sentences after the starting point can be obtained and taken as unbroadcast sentences to be registered. If there is a sentence in the unbroadcast sentences to be registered that is consistent with the sentence to be matched, the sentence that is consistent with the sentence to be matched can be used as the target sentence. If the unbroadcast sentences to be registered do not include the sentence to be matched, it indicates that the target text does not include the sentence to be matched.

According to the technical solution of the embodiments of the present disclosure, when collecting the voice information to be processed, the acoustic features to be processed corresponding to the voice information to be processed can be determined, and the acoustic features to be processed are input to the decoder and/or keyword detection system corresponding to the target text to obtain the sentence to be matched corresponding to the acoustic features to be processed; at the same time, a sentence in the target text corresponding to the sentence to be matched can be determined, which solves the problem in the related art that the teleprompter only plays a role of displaying the broadcasting text but cannot effectively prompt the user, resulting in the problem of poor prompt effect. In the process of broadcasting by the target user, the voice information of the broadcasting user is collected, the target sentence in the broadcasting text corresponding to the voice information is determined, and the target sentence is displayed distinctively on the teleprompter, thus the teleprompter can intelligently follow the broadcast user, thereby improving the technical effect of the broadcasting effect.

Embodiment Five

Figure 6:
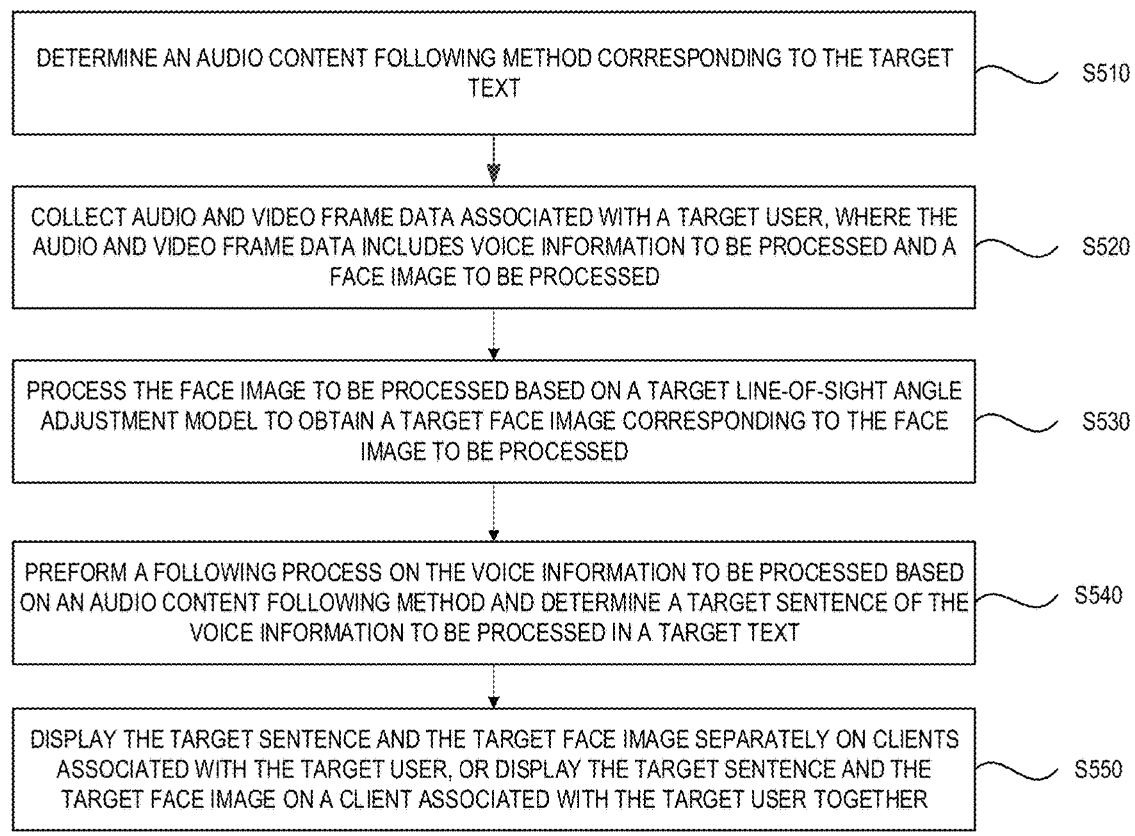
FIG. 6 is a schematic flowchart of a data processing method provided in Embodiment Five of the present disclosure.

FIG. 6 is a schematic flowchart of a data processing method according to Embodiment Five of the present disclosure. On the basis of the foregoing embodiments, the decoder and keyword detection system corresponding to the target text can be determined first, and then the acoustic features to be processed can be processed based on the decoder and keyword detection system. The specific implementation can refer to the description of the present technical solution. The same or corresponding technical terms as the above embodiments are not repeated here.

As shown in FIG. 6, the method includes:

S510, determining an audio content following method corresponding to the target text.

In the present embodiment, determining the decoder corresponding to the target text may include: obtaining the target text, and performing word segmentation processing on the target text to obtain at least one broadcasting vocabulary corresponding to the target text; obtaining a target language model based on the at least one broadcasting vocabulary; determining an interpolation language model based on the target language model and a common language model; performing dynamical composition on the interpolation language model by a weighted finite state transducer to obtain a decoder corresponding to the target text.

Various word segmentation tools can be used, such as jieba word segmentation tool, to perform word segmentation on the target text to obtain the at least one broadcasting vocabulary. After obtaining at least one broadcasting vocabulary, a target language model corresponding to the target text can be trained, the target language model can be a binary classification model. The common language model is a commonly used language model. An interpolation language model can be obtained based on the target language model and the common language model. The interpolation language model may determine voices spoken by the target user during the broadcasting but unrelated to the target text. By using a weighted finite state transducer to perform dynamical composition, a decoder corresponding to the interpolation language model can be obtained. At this time, the decoder is highly correlated with the target text. Since the decoder is highly correlated with the target text, the sentence to be matched corresponding to the acoustic features to be processed can be effectively determined based on the decoder.

In the present embodiment, determining the keyword detection system corresponding to the target text may include: dividing the target text into at least one broadcasting vocabulary; according to a predetermined classification rule, determining a category corresponding to the at least one broadcasting vocabulary; and generating the keyword detection system based on the broadcasting vocabulary corresponding to each category.

For example, the target text can be divided into a plurality of broadcast vocabularies based on word segmentation tool. Each broadcasting vocabulary can be used as a keyword. The pre-set classification rule can be a rue for classifying the keywords. After determining the categories, the broadcasting vocabulary corresponding to each category can be determined, and then a keyword detection system can be generated based on the broadcasting vocabulary of each category.

S520, collecting audio and video frame data associated with a target user, where the audio and video frame data includes voice information to be processed and a face image to be processed.

S530, processing the face image to be processed based on a target line-of-sight angle adjustment model to obtain a target face image corresponding to the face image to be processed.

S540, performing a following process on the voice information to be processed based on an audio content following method and determining a target sentence of the voice information to be processed in a target text.

After collecting the voice information to be processed of the target user based on a microphone array, that is, the way voice waveform, the acoustic features to be processed can be extracted from the voice information to be processed based on the method for extracting audio features from voices. The acoustic posterior probability can be obtained by processing the acoustic features to be processed based on the conformer acoustic model. The acoustic posterior probability can be input into the decoder to obtain the first sentence to be determined and the confidence level corresponding to the first sentence to be determined. At the same time, the acoustic features to be processed can be input to the keyword detection system to obtain the second sentence to be determined corresponding to the acoustic features to be processed and the confidence level corresponding to the second sentence to be determined. The sentence to be matched is determined by combining the sentences to be determined corresponding to the two confidence levels. For example, the sentence to be determined with a higher confidence level is used as the sentence to be matched.

In the present embodiment, determining a target sentence in the target text corresponding the sentence to be matched may include: by taking the last sentence of the currently broadcast text in the target text as a starting point, determining whether the next text sentence is consistent with the sentence to be matched, if the next text sentence is consistent with the sentence to be matched, the next text sentence is determined as the target text. If the next text sentence is inconsistent with the sentence to be matched, it is determined whether a sentence next to the next text sentence is consistent with the sentence to be matched, and if this sentence is consistent with the sentence to be matched, it is determined as the target sentence. If the target sentence is not consistent with the sentence to be matched, it is determined that the current words spoken by the target user are irrelevant to the target text and thus may not be processed.

S550, displaying the target sentence and the target face image separately on clients associated with the target user, or displaying the target sentence and the target face image on a client associated with the target user together.

The target sentence can be distinguished from other sentences in the target text.

Based on the above technical solution, in the process of determining the target sentence, the method also includes: determining an actual voice duration corresponding to the target text; adjusting a predicted voice duration corresponding to an unmatched sentence in the target text according to the actual voice duration and the unmatched sentence; and displaying the predicted voice duration on a target client, so as to prompt the target user.

The actual voice duration refers to a duration during which the target user speaks the target sentence, for example, 2S. The predicted voice duration refers to the duration required by the target user to broadcast subsequent unbroadcast sentences. The predicted broadcast duration is a dynamically adjusted duration, which is mainly adjusted based on the speech rate of the target user. The determination of speech rate may include determine a duration used for each character according to an actual voice duration of the target sentence and the number of characters corresponding to the target sentence. The duration required for subsequent broadcasting the unbroadcast sentence can be determined based on the duration used for each character and the total number of characters in subsequent unbroadcast sentence. The unbroadcast sentence can be taken as unmatched sentence.

In the actual application process, in order to remind users in a timely manner, the predicted voice duration can be displayed on a target client corresponding to the target user. At the same time, the target user can also adjust the speech rate for broadcasting text according to the predicted voice duration, so that the broadcast duration is consistent with the preset duration, that is, the content of the target text can be broadcast within the limited time.

For a target user, the durations for broadcasting individual sentences are different, and the corresponding duration for broadcasting individual characters are also different. In the process of broadcasting by target users, the predicted voice duration can be dynamically adjusted according to the current durations used for broadcasting each character.

Based on the above technical solution, the method further includes: when the target text is received, performing pause annotation on the target text, and displaying a pause annotation identifier on the client, so that the target user reads the target text based on the pause annotation identifier.

With the widespread popularity of video shooting, not every video creator has the opportunity to receive professional training related to broadcasting and hosting. Therefore, as a teleprompter or an application, if it can help video creators with zero broadcasting foundation produce higher quality oral videos, the teleprompter or the application will become more universal. For ordinary users who lack professional capability in word segmentation analysis, they cannot determine when to pause when facing the input target text and what emotion to use to deal with each sentence of broadcasting text. Therefore, on the basis of achieving the above technical effects, a pause annotation model is also provided in the present technical solution, so that after uploading the target text, the target text can be annotated with word segmentation, and the word segmentation annotation result is displayed on the target terminal used by the target user, so that the user may broadcast the target text based on word segmentation annotation, thus improving the professionality in broadcasting the target text.

The pause annotation identifier can be represented by "/". For example, if a long pause is needed, it can be represented by "--", and if a short pause is needed, it can be represented by "-". If two words need to be linked, it can be represented by "( )", etc. At the same time, the pause annotation identifier can be displayed in the target text, and the target text can be displayed on the target terminal.

After uploading the target text to the server corresponding to the mobile terminal, the word segmentation annotation and the pausing annotation can be performed on the target text, so that when the target user broadcasts, the way for broadcasting can be determined at a glance according to the word segmentation annotation and pausing annotation, thus solving the problem in the art that the way for performing word segmentation annotation and pausing annotation on the broadcasting text content has to be determined manually, the efficiency of which is low.

In the present embodiment, the word segmentation annotation and the pausing annotation performed on the target text may be achieved based on a pre-trained word segmentation and pausing model.

Based on the above technical solution, the method further includes: marking the broadcast sentences in the target text with broadcasting marks to determine the broadcast sentences and unbroadcast sentences in the target text based on broadcasting marks.

In the broadcasting process by the users, the broadcast sentences and unbroadcast sentences in the target text can be marked with different colors, so that the target user can distinguish between broadcast sentences and unbroadcast sentences well during the broadcasting process. At the same time, the target content can also be distinctively displayed, which can clearly prompt the target user of the content currently read and the content to be read, thereby solving the problem of line skipping when the target user broadcasts the text.

Based on the above technical solution, the method further includes: when the target text is received, performing emotion annotation on each sentence in the target text based on a pretrained emotion annotation model, so that the target user broadcasts the target text based on the emotion annotation. That is, when receiving the target text, each sentence in the target text is emotionally annotated, and the emotion annotation identifier is displayed on the client, so that the user can read the target text based on the emotion annotation identifier.

For ordinary users, in additional to not knowing where to pause in the target text, it is usually unclear what emotional color to use to broadcast the text. At this time, after receiving the uploaded target text, the target text can be preprocessed. For example, emotional color analysis can be performed on each sentence in the target text, and each sentence obtained through analysis can be annotated with expressions, so that users can broadcast the content of the target text based on emotional color identifier, solving the problem of monotonous reading.

According to the technical solution of the embodiment of the present disclosure, word segmentation processing are performed on the uploaded target text, and a decoder and a keyword detection system corresponding to the target text are obtained, so as to process the extracted acoustic features based on the decoder and the keyword detection system, and determine whether the content spoken by the user currently is the content of the target text; then the content is displayed distinctively, thereby realizing the effect that the text displayed distinctively can intelligently follow the anchor user. At the same time, in order to improve the effect of broadcasting, the word segmentation annotation and pausing annotation as well as the emotion annotation can be performed on the target text, so that the user may broadcast the text according to the word segmentation annotation and pause annotation and the emotion annotation, realizing the three-dimensionality of broadcasting the broadcast text.

Embodiment Six

Figure 7:
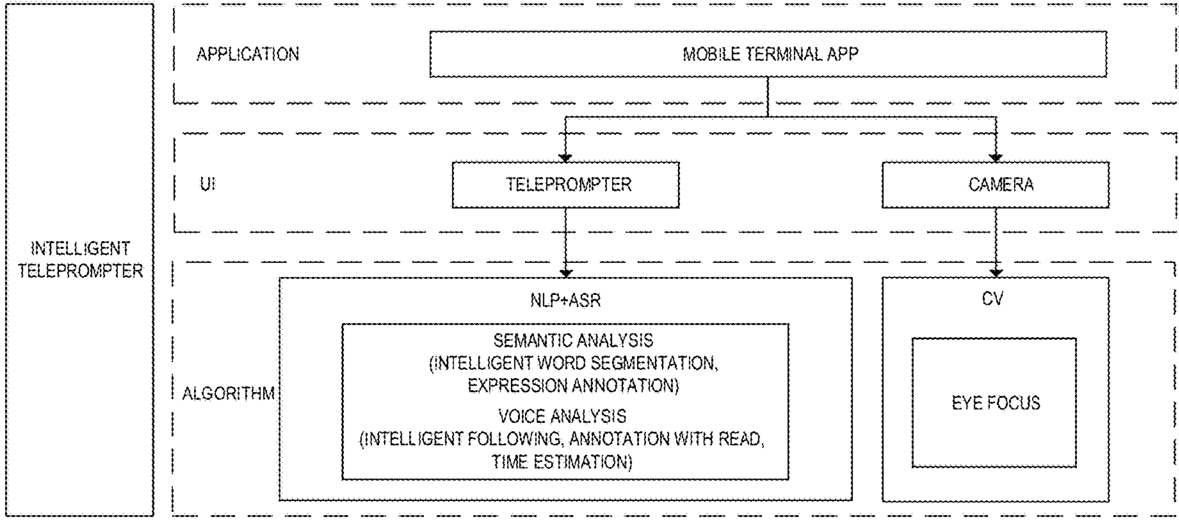
FIG. 7 is a structural schematic diagram of an intelligent teleprompter provided in Embodiment Six of the present disclosure.

FIG. 7 is a structural schematic diagram of an intelligent teleprompter provided in the Embodiment Six of the present application. The intelligent teleprompter can implement the above data processing method. As shown in FIG. 7, the intelligent teleprompter includes: an application layer, and the teleprompter method can be deployed in an application, which can be an application installed at a mobile terminal that can perform LIVE interaction. On the display interface, the target text can be displayed, and the target sentence corresponding to the voice information of the target user can be displayed distinctively. At the same time, intelligent word segmentation, expression annotation, and intelligent word segmentation and pause are performed on the target text based on the algorithm for analyzing and processing the voice information, and intelligent semantic analysis can also be performed on the target text to achieve intelligent following, read annotation, and duration prediction of unread sentences. The implementation method can be found in the above embodiments. At the same time, the face image of the target user can also be displayed on the display interface, and the target user's line-of-sight can be focused based on the target line-of-sight angle adjustment model in the algorithm to obtain the target face image with the target angle, and the target face image is sent to the client viewing the LIVE.

Figure 8:
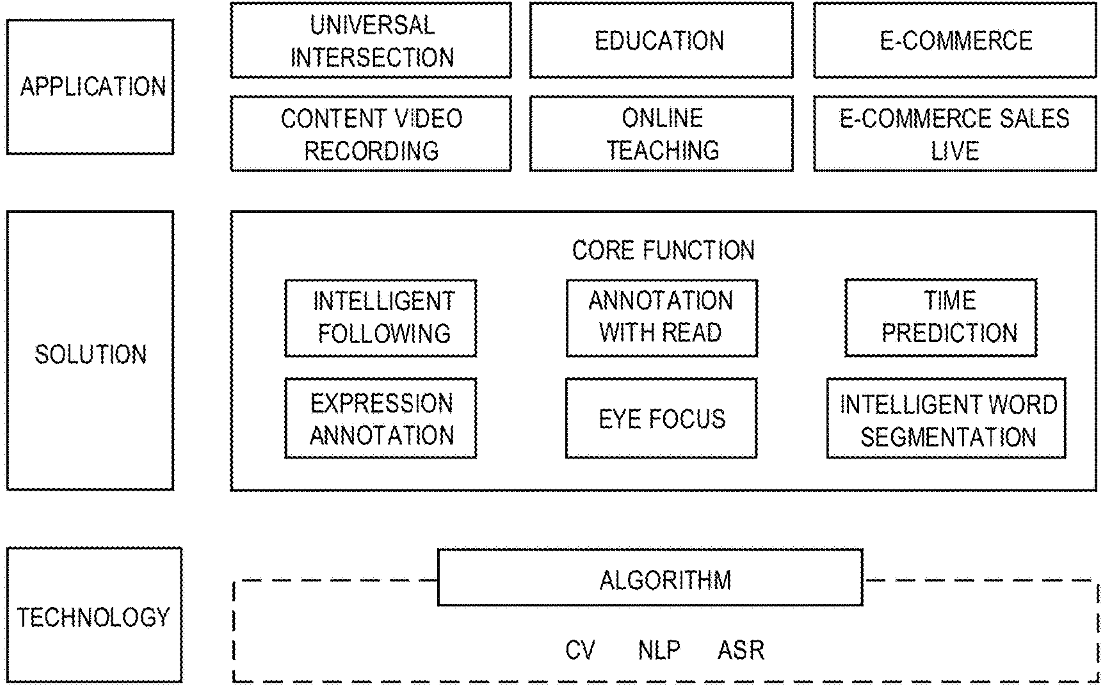
FIG. 8 is a schematic diagram of an architecture corresponding to the intelligent teleprompter provided in the Embodiment Six of the present disclosure.

The application scenarios, technical solutions, and algorithms used in this embodiment can be shown in FIG. 8. The application scenarios may be any scenario that requires interaction, such as online education scenarios, LIVE scenarios in the e-commerce field, content video recording scenarios, or online teaching scenarios. The implemented solutions can be intelligent following, read annotation, time prediction, expression annotation, eye focus, and intelligent word segmentation; the algorithms used to achieve the above functions may include Model Training algorithms and voice intelligent analysis algorithms.

Embodiment Seven

Figure 9:
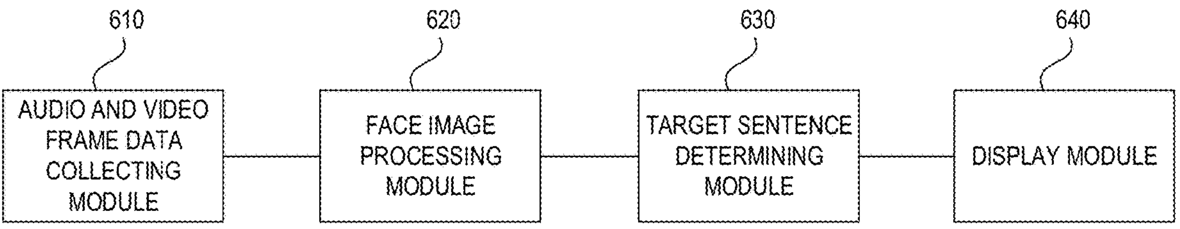
FIG. 9 is a structural schematic diagram of a data processing apparatus provided in Embodiment Seven of the present disclosure.

FIG. 9 is a structural schematic diagram of a data processing apparatus provided in Embodiment Seven of the present disclosure, which can execute the data processing method provided in any embodiment of the present disclosure, and has the corresponding functional modules and effects of the method executed. As shown in FIG. 9, the apparatus includes: an audio and video frame data collecting module 610, a face image processing module 620, a target sentence determining module 630, and a display module 640.

The audio and video frame data collecting module 610 is configured to collect audio and video frame data associated with a target user, wherein the audio and video frame data includes voice information to be processed and a face image to be processed; the face image processing module 620 is configured to process the face image to be processed based on a target line-of-sight angle adjustment model to obtain a target face image corresponding to the face image to be processed; the target sentence determining module 630 is configured to perform a following process on the voice information to be processed based on an audio content following method and determine a target sentence in a target text associated with the voice information to be processed; the display module configured to display the target sentence and the target face image separately on clients associated with the target user, or display the target sentence and the target face image on a client associated with the target user together.

Based on the above technical solution, the audio and video frame data collecting module 610 is further configured to receive, before collecting audio and video frame data associated with the target user, the target text uploaded to enable the target user to interact based on the target text.

Based on the above technical solution, the audio and video frame data collecting module 610 is configured to collect the voice information to be processed of the target user based on a voice collecting apparatus and collect the face image to be processed of the target user based on a camera apparatus, when detecting that a preset event is triggered.

Based on the above technical solution, the face image processing module 620 is also configured to: input the face image to be processed into the target line-of-sight angle adjustment model to obtain the target face image; where a line-of-sight angle of the target user in the target face image is consistent with a target line-of-sight angle.

Based on the above technical solution, the apparatus further includes: a target line-of-sight angle adjustment model training module, including:

a sample set obtaining unit configured to acquire a training sample set; where the training sample set includes a plurality of training samples, each of the training samples includes a target line-of-sight angle image and a non-target line-of-sight angle image, and the training samples are determined based on a target sample generative model obtained by pre-training; and a target line-of-sight angle adjustment model training unit configured to input, with respect to each of the training samples, the non-target line-of-sight angle image in a current training sample into a line-of-sight angle adjustment model to be trained to obtain an actual output image corresponding to the current training sample, determine a loss value based on the target line-of-sight angle image and the actual output image of the current training sample, and adjust model parameters of the line-of-sight angle adjustment model to be trained based on the loss value and a preset loss function of the line-of-sight angle adjustment model to be trained, take convergence of the preset loss function of the line-ofsight angle adjustment model to be trained as a training target to obtain the target line-of-sight angle adjustment model.

Based on the above technical solution, the apparatus further comprises: a sample generative model training module configured to obtain the target sample generative model by training; where the target sample generative model includes a target line-of-sight angle image generative sub-model and a non-target line-of-sight angle image generative sub-model.

Based on the above technical solution, the sample generative model training module includes:

an error value determining unit configured to process a pre-collected Gaussian distribution vector based on a generator in a non-target line-of-sight angle image generative sub-model to be trained to obtain an image to be compared, processing an original non-frontal sample image and the image to be compared based on a discriminator in the non-target line-of-sight angle image generative sub-model to be trained to obtain an error value, where the original non-frontal sample image is a pre-collected image; a parameter correction unit configured to correct model parameters in the non-target line-of-sight angle image generative sub-model to be trained based on the error value and a loss function in the non-target line-of-sight angle image generative sub-model to be trained; a sub-model generating unit configured to take convergence of the loss function as a training target to obtain the non-target line-of-sight angle image generative sub-model, so as to generate the non-target line-of-sight angle image in the training sample based on the non-target line-of-sight angle image generative sub-model.

Based on the above technical solution, the sample generative model training module is also configured to:

obtain model parameters in the non-target line-of-sight angle image generative sub-model, and reuse the model parameters in a target line-of-sight angle image generative sub-model to be trained; and train the target line-of-sight angle image generative sub-model to be trained based on the pre-collected Gaussian distribution vector and the original frontal sample image to obtain the target line-of-sight angle image generative sub-model, so as to generate the target line-of-sight angle image in the training sample based on the target line-of-sight angle image generative sub-model.

Based on the above technical solution, an audio feature extraction algorithm and a decoder are included in the audio content following method, and the target sentence determining module 630 is configured to:

perform feature extraction on the voice information to be processed based on the audio feature extraction algorithm to obtain acoustic features to be processed; process the acoustic features to be processed based on an acoustic model to obtain an acoustic posterior probability corresponding to the acoustic features to be processed; determine a first sentence to be determined and a first confidence level corresponding to the first sentence to be determined based on the acoustic posterior probability and the decoder; where the decoder is determined according to an interpolation language model corresponding to the target text, and the interpolation language model is determined according to a common language model and a target language model corresponding to the target text; and when the first confidence level satisfies a preset confidence threshold, take the first sentence to be determined as a sentence to be matched, and determine the target sentence according to the sentence to be matched.

Based on the above technical solution, a keyword detection system is included in the audio content following method; the target sentence determining module 630 is configured to:

process acoustic features to be processed of the voice information to be processed based on the keyword detection system, and determine a second sentence to be determined corresponding to the acoustic features to be processed and a second confidence level of the second sentence to be determined; and when the second confidence level satisfies a preset confidence threshold, take the second sentence to be determined as a sentence to be matched, and determine the target sentence according to the sentence to be matched.

Based on the above technical solution, the target sentence determining module 630 is configured to:

in case where a keyword detection system and a decoder are included in the audio content following method and acoustic features to be processed are processed based on the decoder and the keyword detection system respectively to obtain a first sentence to be determined and a second sentence to be determined, determine a sentence to be matched according to a first confidence level of the first sentence to be determined and a second confidence level of the second sentence to be determined, and determine the target sentence according to the sentence to be matched.

Based on the above technical solution, the display module 640 is configured to: distinctively display the target sentence in the target text on a first client, and display a target audio and video frame corresponding to the target face image on a second client.

Based on the above technical solution, the apparatus further includes: a decoder generative module configured to:

determining a decoder corresponding to the target text; and the determining a decoder corresponding to the target text includes: obtaining the target text and performing word segmentation on the target text to obtain at least one broadcasting vocabulary corresponding to the target text; obtain a target language model based on the at least one broadcasting vocabulary; determining an interpolation language model based on the target language model and the common language model; performing dynamical composition on the interpolation language model through a weighted finite state transducer to obtain a decoder corresponding to the target text.

Based on the above technical solution, the apparatus further includes: a keyword detection system generative module configured to:

divide the target text into at least one broadcasting vocabulary; determine a category corresponding to the at least one broadcasting vocabulary according to a predetermined classification rule; and generate the keyword detection system based on the broadcasting vocabulary corresponding to each category.

Based on the above technical solution, the display module 640 includes: a different display unit configured to:

highlight the target sentence; or display the target sentence in bold; or display other sentences except the target sentence in a semi-transparent form; where the transparency of a preset number of unbroadcasted texts adjacent to the target sentence is lower than that of other texts to be broadcasted.

Based on the above technical solution, the display module 640 includes: a duration predicting unit configured to:

determine an actual voice duration corresponding to the voice information to be processed; adjust a predicted voice duration corresponding to an unread sentence in the target text according to the actual voice duration and the unread sentence; and display the predicted voice duration on a target client to which the target user belongs, so as to prompt the target user.

Based on the above technical solution, the apparatus further includes: a pause annotation module configured to:

when the target text is received, annotate the target text with pauses, and display a pause annotation identifier on the client, so that the target user reads the target text based on the pause annotation identifier.

Based on the above technical solution, the apparatus further includes: an emotion annotation module, configured to:

when the target text is received, perform emotion annotation on each sentence in the target text, and display an emotion annotation identifier on the client, so that the target user reads the target text based on the emotion annotation identifier.

According to the technical solution of the embodiment of the present disclosure, the voice information to be processed and the face image to be processed of the target user may be collected, and then the voice information to be processed and the face image to be processed is processed to obtain the target face image and the position of the target sentence in the target text corresponding to the voice information to be processed. Thus, the problem in the related art that the teleprompter occupies a large area and the use of the teleprompter is complicated and thus is inconvenient, is solved, thereby achieving the technical effect that high-efficiency broadcasting can be performed based on the mobile terminal.

A plurality of units and modules included in the above apparatus are only divided according to functional logic, but the present application is not limited to the above division, as long as the corresponding function can be achieved; Further, the names of the plurality of functional units are used only for ease of distinction from each other, but not intended to limit the scope of the embodiments of the present disclosure.

Embodiment Seven

Figure 10:
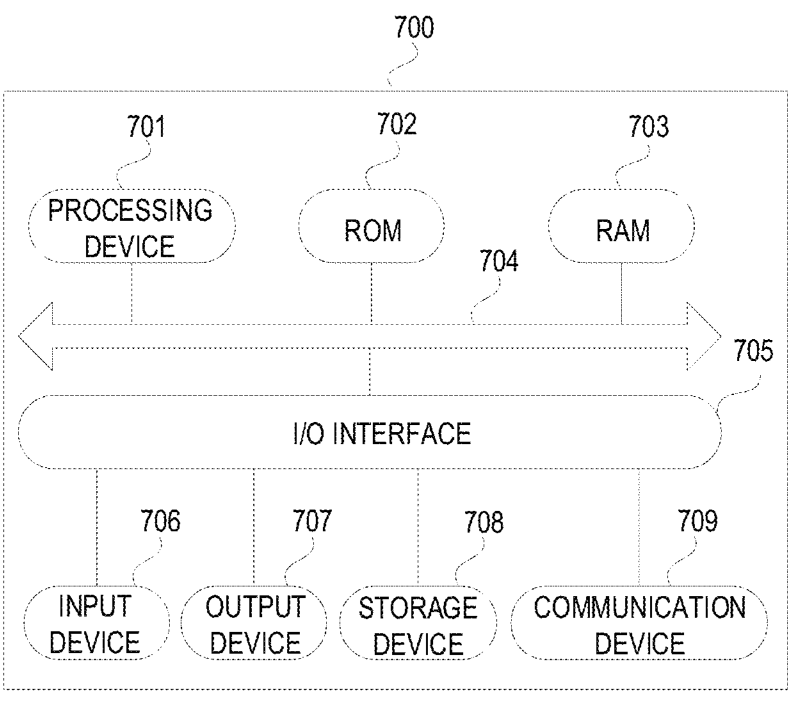
FIG. 10 is a structural schematic diagram of an electronic device provided in Embodiment Eight of the present disclosure.

FIG. 10 is a structural schematic diagram of an electronic device provided in Embodiment Eight of the present disclosure. Referring to FIG. 10 below, it is a structural schematic diagram of an electronic device (such as the terminal device or server in FIG. 10) 700 suitable for implementing the embodiment of the present disclosure. The terminal device 700 in the embodiment of the present disclosure may include but is not limited to mobile terminals such as mobile phones, laptops, digital broadcast receivers, PDAs (Personal Digital Assistants), PADs (tablet computers), PMPs (portable multimedia players), car-mounted terminals (such as car navigation terminals), etc. and fixed terminals such as digital televisions (TV), desktop computers, etc. The electronic device 700 shown in FIG. 10 is only an example and should not bring any limitation on the functionality and scope of use of the embodiment of the present disclosure.

As shown in FIG. 10, the electronic device 700 may include a processing device (such as a central processing unit, graphics processing unit, etc.) 701, which may perform various appropriate actions and processes based on programs stored in Read-Only Memory (ROM) 702 or loaded from storage device 708 into Random Access Memory (RAM) 703. In the RAM 703, various programs and data necessary for the operation of the electronic device 700 are also stored. The processing device 701, ROM 702, and RAM 703 are connected to each other through a bus 704. An Input/Output I/O interface 705 is also connected to the bus 704.

Typically, the following apparatuses can be connected to I/O interface 705: input devices 706 including, for example, touch screens, touchpads, keyboards, mice, cameras, microphones, accelerometers, gyroscopes, etc.; output devices 707 including liquid crystal displays (LCDs), speakers, vibrators, etc.; storage devices 708 including magnetic tapes, hard disks, etc.; and a communication device 709. The communication device 709 may allow the electronic device 700 to communicate with other apparatuses wirelessly or wirelessly to exchange data. Although FIG. 10 shows an electronic device 700 with a plurality of apparatuses, it shall be understood that it is not required to implement or have all of the apparatuses shown. More or fewer apparatuses can be implemented or provided instead.

According to embodiments of the present disclosure, the process described above with reference to the flowchart can be implemented as a computer software program. For example, an embodiment of the present disclosure includes a computer program product that includes a computer program carried on a non-transitory computer-readable medium, where the computer program includes program code for performing the method shown in the flowchart. In such an embodiment, the computer program can be downloaded and installed from a network through the communication device 709, or installed from the storage device 708, or installed from the ROM 702. When the computer program is executed by the processing device 701, the above functions defined in the method of the embodiment of the present disclosure are performed.

The names of the messages or information exchanged between a plurality of apparatuses in the embodiment of the present disclosure are for illustrative purposes only and are not intended to limit the scope of these messages or information.

The electronic device provided in this embodiment of the present disclosure and the data processing method provided in the above embodiments belongs to the same idea. Technical details that are not described in detail in this embodiment can be found in the above embodiments, and this embodiment has the same effect as the above embodiments.

Embodiment Eight

An embodiment of the present disclosure provides a computer storage medium on which a computer program is stored, when being executed by a processor, the program implements the data processing method provided in the above embodiments.

The computer-readable medium described above can be a computer-readable signal medium or a computer-readable storage medium, or any combination thereof. The computer-readable storage medium can be, for example, but not limited to, an electrical, magnetic, optical, electromagnetic, infrared, or semiconductor system, apparatus, or device, or any combination thereof. The computer-readable storage media may include but are not limited to: an electrical connection with one or more wires, a portable computer disk, a hard disk, random access memory (RAM), read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium may be any tangible medium containing or storing a program that can be used by an instruction execution system, apparatus, or device, or can be used in combination with an instruction execution system, apparatus, or device. In the present disclosure, a computer-readable signal medium can include a data signal propagated in baseband or as part of a carrier wave, which carries computer-readable program code therein. Such propagated data signals may take many forms, including but not limited to electromagnetic signals, optical signals, or any suitable combination thereof. A computer-readable signal medium may also be any computer-readable medium other than a computer-readable storage medium, which can send, propagate, or transmit programs for use by or in conjunction with instruction execution systems, apparatus, or devices. The program code contained on the computer-readable medium may be transmitted using any suitable medium, including but not limited to: wires, optical cables, radio frequency (RF), etc., or any suitable combination thereof.

In some embodiments, clients and servers can communicate using any currently known or future developed network protocol such as HTTP (HyperText Transfer Protocol), and can be interconnected with any form or medium of digital data communication (such as communication networks). Examples of communication networks include local area networks (LANs), wide area networks (WANs), internetworks (such as the Internet), and end-to-end networks (such as ad hoc end-to-end networks), as well as any currently known or future developed networks.

The computer-readable medium can be included in the electronic device, or it can exist alone without being assembled into the electronic device.

The above-mentioned computer-readable medium carries one or more programs, and when the above-mentioned one or more programs are executed by the electronic device, the electronic device: collect audio and video frame data associated with a target user, wherein the audio and video frame data includes voice information to be processed and a face image to be processed; process the face image to be processed based on a target line-of-sight angle adjustment model to obtain a target face image corresponding to the face image to be processed; perform a following process on the voice information to be processed based on an audio content following method and determine a target sentence in a target text associated with the voice information to be processed; and display the target sentence and the target face image separately on clients associated with the target user, or display the target sentence and the target face image on a client associated with the target user together.

Computer program codes for performing the operations of the present disclosure may be written in one or more programming languages or a combination thereof, including but not limited to Object Oriented programming languages—such as Java, Smalltalk, C++, and also conventional procedural programming languages—such as "C" or similar programming languages. The program code may be executed entirely on the user's computer, partially executed on the user's computer, executed as a standalone software package, partially executed on the user's computer and partially on a remote computer, or entirely on a remote computer or server. In the case of involving a remote computer, the remote computer may be any kind of network—including local area network (LAN) or wide area network (WAN)—connected to the user's computer, or may be connected to an external computer (e.g., through an Internet service provider to connect via the Internet).

The flowcharts and block diagrams in the accompanying drawings illustrate the architecture, functions, and operations of possible implementations of the system, method, and computer program product according to various embodiments of the present disclosure. In this regard, each block in a flowchart or block diagram may represent a module, program segment, or portion of code that contains one or more executable instructions for implementing a specified logical function. It should also be noted that in some alternative implementations, the functions marked in the blocks may occur in a different order than those marked in the drawings. For example, two consecutive blocks may actually be executed in parallel, or they may sometimes be executed in reverse order, depending on the function involved. It should also be noted that each block in the block diagrams and/or flowcharts, as well as combinations of blocks in the block diagrams and/or flowcharts, may be implemented using a dedicated hardware-based system that performs the specified function or operations, or may be implemented using a combination of dedicated hardware and computer instructions.

The units described in the embodiments of the present disclosure may be implemented by means of software or hardware, and the name of the unit does not constitute a limitation on the unit itself in a certain case, for example, a first obtaining unit may also be described as "a unit for obtaining at least two internet protocol addresses".

The functions described herein above can be performed at least in part by one or more hardware logic components. For example, without limitation, exemplary types of hardware logic components that may be used include: Field Programmable Gate Arrays (FPGAs), Application Specific Integrated Circuits (ASICs), Application Specific Standard Parts (ASSPs), System on Chip (SOCs), Complex Programmable Logic Devices (CPLDs), and so on.

In the context of this disclosure, a machine-readable medium can be a tangible medium that may contain or store programs for use by or in conjunction with instruction execution systems, apparatuses, or devices. A machine-readable medium may be a machine-readable signal medium or a machine-readable storage medium. A machine-readable medium may include, but are not limited to, electronic, magnetic, optical, electromagnetic, infrared, or semiconductor systems, apparatuses, or devices, or any suitable combination thereof. Examples of the machine-readable storage medium may include electrical connections based on one or more wires, portable computer disks, hard disks, random access memory (RAM), read-only memory (ROM), erasable programmable read-only memory (EPROM or flash memory), optical fibers, convenient compact disk read-only memory (CD-ROM), optical storage devices, magnetic storage devices, or any suitable combination thereof.

According to one or more embodiments of the present disclosure, [Example 1] provides a data processing method, including:

collecting audio and video frame data associated with a target user, wherein the audio and video frame data includes voice information to be processed and a face image to be processed;

processing the face image to be processed based on a target line-of-sight angle adjustment model to obtain a target face image corresponding to the face image to be processed;

performing a following process on the voice information to be processed based on an audio content following method and determining a target sentence in a target text associated with the voice information to be processed; and displaying the target sentence and the target face image separately on clients associated with the target user, or displaying the target sentence and the target face image on a client associated with the target user together.

According to one or more embodiments of the present disclosure, [Example 2] provides a data processing method, where, before collecting audio and video frame data associated with the target user, the method includes:

receive the target text uploaded to enable the target user to interact based on the target text.

According to one or more embodiments of the present disclosure, [Example 3] provides a data processing method, where the collecting audio and video frame data associated with a target user includes:

when detecting that a preset event is triggered, collecting the voice information to be processed of the target user based on a voice collecting apparatus, and collecting the face image to be processed of the target user based on a camera apparatus.

According to one or more embodiments of the present disclosure, [Example 4] provides a data processing method, wherein the processing the face image to be processed based on a target line-of-sight angle adjustment model to obtain a target face image corresponding to the face image to be processed includes:

inputting the face image to be processed into the target line-of-sight angle adjustment model to obtain the target face image; where a line-of-sight angle of the target user in the target face image is consistent with a target line-of-sight angle.

According to one or more embodiments of the present disclosure, [Example 5] provides a data processing method, the method further includes obtaining a training sample set, where the training sample set comprises a plurality of training samples, each of the training samples comprises a target line-of-sight angle image and a non-target line-of-sight angle image, and the training samples are determined based on a target sample generative model obtained by pre-training;

with respect to each of the training samples, inputting a non-target line-of-sight angle image in a current training sample into a line-of-sight angle adjustment model to be trained to obtain an actual output image corresponding to the current training sample;

determining a loss value based on the target line-of-sight angle image and the actual output image of the current training sample, and adjusting model parameters of the line-of-sight angle adjustment model to be trained based on the loss value and a preset loss function of the line-of-sight angle adjustment model to be trained; and taking convergence of the preset loss function of the line-of-sight angle adjustment model to be trained as a training target to obtain the target line-of-sight angle adjustment model.

According to one or more embodiments of the present disclosure, [Example 6] provides a data processing method, wherein obtaining a non-target line-of-sight angle image generative sub-model in the target sample generative model by training includes:

processing a pre-collected Gaussian distribution vector based on a generator in a non-target line-of-sight angle image generative sub-model to be trained to obtain an image to be compared;

processing an original non-frontal sample image and the image to be compared based on a discriminator in the non-target line-of-sight angle image generative sub-model to be trained to obtain an error value, wherein the original non-frontal sample image is a pre-collected image;

correcting model parameters in the non-target line-of-sight angle image generative sub-model to be trained based on the error value and a loss function in the non-target line-of-sight angle image generative sub-model to be trained; and taking convergence of the loss function of the non-target line-of-sight angle image generative sub-model to be trained as a training target to obtain the non-target line-of-sight angle image generative sub-model, so as to generate the non-target line-of-sight angle image in the training sample based on the non-target line-of-sight angle image generative sub-model.

According to one or more embodiments of the present disclosure, [Example 7] provides a data processing method, where obtaining a target line-of-sight angle image generative sub-model in the target sample generative model by training:

obtaining model parameters in the non-target line-of-sight angle image generative sub-model, and reusing the model parameters in a target line-of-sight angle image generative sub-model to be trained; and training the target line-of-sight angle image generative sub-model to be trained based on the pre-collected Gaussian distribution vector and the original frontal sample image to obtain the target line-of-sight angle image generative sub-model, so as to generate the target line-of-sight angle image in the training sample based on the target line-of-sight angle image generative sub-model.

According to one or more embodiments of the present disclosure, [Example 8] provides a data processing method, where an audio feature extraction algorithm and a decoder corresponding to the target text are included in the audio content following method; the performing a following process on the voice information to be processed based on an audio content following method and determining a target sentence in a target text associated with the voice information to be processed includes:

performing feature extraction on the voice information to be processed based on the audio feature extraction algorithm to obtain acoustic features to be processed;

processing the acoustic features to be processed based on an acoustic model to obtain an acoustic posterior probability corresponding to the acoustic features to be processed;

determining a first sentence to be determined and a first confidence level corresponding to the first sentence to be determined based on the acoustic posterior probability and the decoder; wherein the decoder is determined according to an interpolation language model corresponding to the target text, and the interpolation language model is determined according to a common language model and a target language model corresponding to the target text; and when the first confidence level satisfies a preset confidence threshold, taking the first sentence to be determined as a sentence to be matched, and determining the target sentence according to the sentence to be matched.

According to one or more embodiments of the present disclosure, [Example 9] provides a data processing method, where a keyword detection system is included in the audio content following method; and the performing a following process on the voice information to be processed based on an audio content following method and determining a target sentence in a target text associated with the voice information to be processed includes:

processing acoustic features to be processed of the voice information to be processed based on the keyword detection system, and determining a second sentence to be determined corresponding to the acoustic features to be processed and a second confidence level of the second sentence to be determined; and when the second confidence level satisfies a preset confidence threshold, taking the second sentence to be determined as a sentence to be matched, and determining the target sentence according to the sentence to be matched.

According to one or more embodiments of the present disclosure, [Example 10] provides a data processing method, where the performing a following process on the voice information to be processed based on an audio content following method and determining a target sentence in a target text associated with the voice information to be processed includes:

in case where a keyword detection system and a decoder are included in the audio content following method and acoustic features to be processed are processed based on the decoder and the keyword detection system respectively to obtain a first sentence to be determined and a second sentence to be determined, determining a sentence to be matched according to a first confidence level of the first sentence to be determined and a second confidence level of the second sentence to be determined, and determining the target sentence according to the sentence to be matched.

According to one or more embodiments of the present disclosure, [Example 11] provides a data processing method, where the displaying the target sentence and the target face image separately on clients associated with the target user, or displaying the target sentence and the target face image on a client associated with the target user together includes:

distinctively displaying the target sentence in the target text on a first client, and displaying a target audio and video frame corresponding to the target face image on a second client.

According to one or more embodiments of the present disclosure, [Example 12] provides a data processing method, where determining a decoder corresponding to the target text;

the determining a decoder corresponding to the target text includes:

obtaining the target text and performing word segmentation on the target text to obtain at least one broadcasting vocabulary corresponding to the target text.

obtaining a target language model based on the at least one broadcasting vocabulary;

determining an interpolation language model based on the target language model and the common language model;

performing dynamical composition on the interpolation language model by a weighted finite state transducer to obtain a decoder corresponding to the target text.

According to one or more embodiments of the present disclosure, [Example 13] provides a data processing method, wherein determining a keyword detection system corresponding to the target text, including:

dividing the target broadcasting text into at least one broadcasting vocabulary;

determine the category corresponding to at least one broadcasting vocabulary according to a predetermined classification rule.

generating the keyword detection system based on the broadcasting vocabulary corresponding to each category.

According to one or more embodiments of the present disclosure, [Example 14] provides a data processing method, where the determining the target sentence in the target text corresponding to the sentence to be matched, including:

if the target text at the current time includes a read sentence that is displayed distinctively, determining the target sentence in the target text corresponding to the sentence to be matched by taking the read sentence as a starting point.

According to one or more embodiments of the present disclosure, [Example 15] provides a data processing method, where determining the target sentence in the target text corresponding to the sentence to be matched by taking the read sentence as a starting point includes:

taking the broadcasted sentence as a starting point and determining a preset number of unread sentences to be registered after the starting point;

If there is a sentence in the unread sentence to be registered that is consistent with the sentence to be matched, taking the sentence that is consistent with the sentence to be matched as the target sentence.

According to one or more embodiments of the present disclosure, [Example 16] provides a data processing method, where the distinctively displaying the target sentence in the target text includes:

highlighting the target sentence; or, displaying the target sentence in bold; or, displaying sentences other than the target sentence in a semi-transparent form; wherein the transparency of the preset number of unbroadcast texts adjacent to the target sentence is lower than that of other texts to be broadcast.

According to one or more embodiments of the present disclosure, [Example 17] provides a data processing method, where, after determining the target sentence, the method further includes:

determining an actual voice duration corresponding to the voice information to be processed;

adjusting a predicted voice duration corresponding to an unread sentence in the target text according to the actual voice duration and the unread sentence; and displaying the predicted voice duration on a target client to which the target user belongs, so as to prompt the target user.

According to one or more embodiments of the present disclosure, [Example 18] provides a data processing method, where, the method further includes when the target text is received, performing pause annotation on the target text, and displaying a pause annotation identifier on the client, so that the target user reads the target text based on the pause annotation identifier.

According to one or more embodiments of the present disclosure, [Example 19] provides a data processing method, where, the method further includes, when the target text is received, performing emotion annotation on each sentence in the target text, and displaying an emotion annotation identifier on the client, so that the target user reads the target text based on the emotion annotation identifier.

According to one or more embodiments of the present disclosure, [Example 20] provides a data processing apparatus comprising:

an audio and video frame data collecting module configured to collect audio and video frame data associated with a target user, wherein the audio and video frame data includes voice information to be processed and a face image to be processed;

a face image processing module configured to process the face image to be processed based on a target line-of-sight angle adjustment model to obtain a target face image corresponding to the face image to be processed;

a target sentence determining module configured to perform a following process on the voice information to be processed based on an audio content following method and determine a target sentence in a target text associated with the voice information to be processed; and a display module configured to display the target sentence and the target face image separately on clients associated with the target user, or display the target sentence and the target face image on a client associated with the target user together.

In addition, although a plurality of operations are depicted in a specific order, this should not be understood as requiring these operations to be performed in the specific order shown or in a sequential order. In certain environments, multitasking and parallel processing may be advantageous. Similarly, although a plurality of implementation details are included in the above discussion, these should not be construed as limiting the scope of the present disclosure. Some features described in the context of individual embodiments can also be implemented in combination in a single embodiment. Conversely, a plurality of features described in the context of a single embodiment can also be implemented in a plurality of embodiments separately or in any suitable sub-combination.

We claim:

1. A data processing method, comprising:

collecting audio and video frame data associated with a target user, wherein the audio and video frame data includes voice information to be processed and a face image to be processed;

processing the face image to be processed based on a target line-of-sight angle adjustment model to obtain a target face image corresponding to the face image to be processed;

performing a following process on the voice information to be processed based on an audio content following method and determining a target sentence in a target text associated with the voice information to be processed; and displaying the target sentence and the target face image separately on clients associated with the target user, or displaying the target sentence and the target face image on a client associated with the target user together;

wherein the target line-of-sight angle adjustment model is trained according to a plurality of training samples in a training sample set, and each of the plurality of training samples comprises a target line-of-sight angle image and a non-target line-of-sight angle image.

2. The method of claim 1, before collecting audio and video frame data associated with the target user, the method further comprising:

receiving the target text uploaded to enable the target user to interact based on the target text.

3. The method of claim 1, wherein the collecting audio and video frame data associated with a target user comprises:

when detecting that a preset event is triggered, collecting the voice information to be processed of the target user based on a voice collecting apparatus, and collecting the face image to be processed of the target user based on a camera apparatus.

4. The method of claim 1, wherein the processing the face image to be processed based on a target line-of-sight angle adjustment model to obtain a target face image corresponding to the face image to be processed, comprising:

inputting the face image to be processed into the target line-of-sight angle adjustment model to obtain the target face image; wherein a line-of-sight angle of the target user in the target face image is consistent with a target line-of-sight angle.

5. The method of claim 1, further comprising:

obtaining the training sample set, wherein the plurality of training samples are determined based on a target sample generative model obtained by pre-training;

with respect to each of the plurality of training samples, inputting the non-target line-of-sight angle image in a current training sample into a line-of-sight angle adjustment model to be trained to obtain an actual output image corresponding to the current training sample;

determining a loss value based on the target line-of-sight angle image and the actual output image of the current training sample, and adjusting model parameters of the line-of-sight angle adjustment model to be trained based on the loss value and a preset loss function of the line-of-sight angle adjustment model to be trained; and taking convergence of the preset loss function of the line-of-sight angle adjustment model to be trained as a training target to obtain the target line-of-sight angle adjustment model.

6. The method of claim 5, further comprising:

obtaining a non-target line-of-sight angle image generative sub-model in the target sample generative model by training, wherein the obtaining a non-target line-of-sight angle image generative sub-model in the target sample generative model by training comprises:

processing a pre-collected Gaussian distribution vector based on a generator in a non-target line-of-sight angle image generative sub-model to be trained to obtain an image to be compared;

processing an original non-frontal sample image and the image to be compared based on a discriminator in the non-target line-of-sight angle image generative sub-model to be trained to obtain an error value, wherein the original non-frontal sample image is a pre-collected image;

correcting model parameters in the non-target line-of-sight angle image generative sub-model to be trained based on the error value and a loss function in the non-target line-of-sight angle image generative sub-model to be trained; and taking convergence of the loss function of the non-target line-of-sight angle image generative sub-model to be trained as a training target to obtain the non-target line-of-sight angle image generative sub-model, so as to generate the non-target line-of-sight angle image in the training sample based on the non-target line-of-sight angle image generative sub-model.

7. The method of claim 5, further comprising:

obtaining a target line-of-sight angle image generative sub-model in the target sample generative model by training, wherein the obtaining a target line-of-sight angle image generative sub-model in the target sample generative model by training comprises:

obtaining model parameters in the non-target line-of-sight angle image generative sub-model, and reusing the model parameters in a target line-of-sight angle image generative sub-model to be trained; and training the target line-of-sight angle image generative sub-model to be trained based on the pre-collected Gaussian distribution vector and the original frontal sample image to obtain the target line-of-sight angle image generative sub-model, so as to generate the target line-of-sight angle image in the training sample based on the target line-of-sight angle image generative sub-model.

8. The method of claim 1, wherein an audio feature extraction algorithm and a decoder corresponding to the target text are included in the audio content following method;

the performing a following process on the voice information to be processed based on an audio content following method and determining a target sentence in a target text associated with the voice information to be processed comprises:

performing feature extraction on the voice information to be processed based on the audio feature extraction algorithm to obtain acoustic features to be processed;

processing the acoustic features to be processed based on an acoustic model to obtain an acoustic posterior probability corresponding to the acoustic features to be processed;

determining a first sentence to be determined and a first confidence level corresponding to the first sentence to be determined based on the acoustic posterior probability and the decoder; wherein the decoder is determined according to an interpolation language model corresponding to the target text, and the interpolation language model is determined according to a target language model corresponding to the target text and a common language model; and when the first confidence level satisfies a preset confidence threshold, taking the first sentence to be determined as a sentence to be matched, and determining the target sentence according to the sentence to be matched.

9. The method of claim 1, wherein a keyword detection system is included in the audio content following method; and the performing a following process on the voice information to be processed based on an audio content following method and determining a target sentence in a target text associated with the voice information to be processed comprises:

processing acoustic features to be processed of the voice information to be processed based on the keyword detection system, and determining a second sentence to be determined corresponding to the acoustic features to be processed and a second confidence level of the second sentence to be determined; and when the second confidence level satisfies a preset confidence threshold, taking the second sentence to be determined as a sentence to be matched, and determining the target sentence according to the sentence to be matched.

10. The method of claim 9, wherein the performing a following process on the voice information to be processed based on an audio content following method and determining a target sentence in a target text associated with the voice information to be processed comprises:

in case where a keyword detection system and a decoder are included in the audio content following method and acoustic features to be processed of the voice information to be processed are processed based on the decoder and the keyword detection system respectively to obtain a first sentence to be determined and a second sentence to be determined, determining a sentence to be matched according to a first confidence level of the first sentence to be determined and a second confidence level of the second sentence to be determined, and determining the target sentence according to the sentence to be matched.

11. The method of claim 1, wherein the displaying the target sentence and the target face image separately on clients associated with the target user, or displaying the target sentence and the target face image on a client associated with the target user together comprises:

distinctively displaying the target sentence in the target text on a first client, and displaying a target audio and video frame corresponding to the target face image on a second client.

12. The method of claim 1, wherein, in a process of determining the target sentence, the method further comprises:

determining an actual voice duration corresponding to the voice information to be processed;

adjusting a predicted voice duration corresponding to an unread sentence in the target text according to the actual voice duration and the unread sentence; and displaying the predicted voice duration on a target client to which the target user belongs, so as to prompt the target user.

13. The method of claim 1, further comprising:

when the target text is received, performing pause annotation on the target text, and displaying a pause annotation identifier on the client, so that the target user reads the target text based on the pause annotation identifier.

14. The method of claim 1, further comprising:

when the target text is received, performing emotion annotation on each sentence in the target text, and displaying an emotion annotation identifier on the client, so that the target user reads the target text based on the emotion annotation identifier.

15. An electronic device comprising:

at least one processor;

a storage device configured to store at least one program;

when the at least one program is executed by the at least one processor, the at least one processor implements acts comprising:

collecting audio and video frame data associated with a target user, wherein the audio and video frame data includes voice information to be processed and a face image to be processed;

processing the face image to be processed based on a target line-of-sight angle adjustment model to obtain a target face image corresponding to the face image to be processed;

performing a following process on the voice information to be processed based on an audio content following method and determining a target sentence in a target text associated with the voice information to be processed; and displaying the target sentence and the target face image separately on clients associated with the target user, or displaying the target sentence and the target face image on a client associated with the target user together;

wherein the target line-of-sight angle adjustment model is trained according to a plurality of training samples in a training sample set, and each of the plurality of training samples comprises a target line-of-sight angle image and a non-target line-of-sight angle image.

16. The electronic device of claim 15, before collecting audio and video frame data associated with the target user, the acts further comprising:

receiving the target text uploaded to enable the target user to interact based on the target text.

17. The electronic device of claim 15, wherein the collecting audio and video frame data associated with a target user comprises:

when detecting that a preset event is triggered, collecting the voice information to be processed of the target user based on a voice collecting apparatus, and collecting the face image to be processed of the target user based on a camera apparatus.

18. The electronic device of claim 15, wherein the processing the face image to be processed based on a target line-of-sight angle adjustment model to obtain a target face image corresponding to the face image to be processed, comprising:

inputting the face image to be processed into the target line-of-sight angle adjustment model to obtain the target face image; wherein a line-of-sight angle of the target user in the target face image is consistent with a target line-of-sight angle.

19. The electronic device of claim 15, the acts further comprising:

obtaining the training sample set, wherein the plurality of training samples are determined based on a target sample generative model obtained by pre-training;

with respect to each of the plurality of training samples, inputting the non-target line-of-sight angle image in a current training sample into a line-of-sight angle adjustment model to be trained to obtain an actual output image corresponding to the current training sample;

determining a loss value based on the target line-of-sight angle image and the actual output image of the current training sample, and adjusting model parameters of the line-of-sight angle adjustment model to be trained based on the loss value and a preset loss function of the line-of-sight angle adjustment model to be trained; and taking convergence of the preset loss function of the line-of-sight angle adjustment model to be trained as a training target to obtain the target line-of-sight angle adjustment model.

20. A non-transitory storage medium comprising computer-executable instructions for performing acts comprising:

collecting audio and video frame data associated with a target user, wherein the audio and video frame data includes voice information to be processed and a face image to be processed;

processing the face image to be processed based on a target line-of-sight angle adjustment model to obtain a target face image corresponding to the face image to be processed;

performing a following process on the voice information to be processed based on an audio content following method and determining a target sentence in a target text associated with the voice information to be processed; and displaying the target sentence and the target face image separately on clients associated with the target user, or displaying the target sentence and the target face image on a client associated with the target user together;

wherein the target line-of-sight angle adjustment model is trained according to a plurality of training samples in a training sample set, and each of the plurality of training samples comprises a target line-of-sight angle image and a non-target line-of-sight angle image.

* * * * *